US012783954B2

(12) United States Patent
Gur et al.

(10) Patent No.: US 12,783,954 B2
(45) Date of Patent: Nov. 3, 2026

(54) INCORPORATING EXPLAINABILITY CONSTRAINTS INTO MACHINE LEARNING MODEL TRAINING

(71) Applicant: International Business Machines Corporation, Armonk, NY (US)

(72) Inventors: Shlomit Gur, Netanya (IL); Roy Abitbol, Zurit (IL); Jonathan Bnayahu, Haifa (IL); Guy Amit, Tel Aviv (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 617 days.

(21) Appl. No.: 18/360,000

(22) Filed: Jul. 27, 2023

(65) Prior Publication Data

US 2025/0037015 A1 Jan. 30, 2025

(51) Int. Cl.
*G06N 20/00* (2019.01)

(52) U.S. Cl.
CPC .................................... *G06N 20/00* (2019.01)

(58) Field of Classification Search
CPC .......... G06N 20/00; G06N 5/01; G06N 5/045; G06N 20/20
See application file for complete search history.

(56) References Cited

U.S. PATENT DOCUMENTS 10,706,329 B2 7/2020 Anushiravani et al.
11,017,324 B2 5/2021 Moore et al.
11,049,043 B2 6/2021 Dalli et al.
11,455,576 B2 9/2022 Dalli et al.
2018/0336487 A1 11/2018 Moore et al.
2019/0303404 A1 10/2019 Amer et al.
(Continued)

FOREIGN PATENT DOCUMENTS

WO 2021096564 A1 5/2021

OTHER PUBLICATIONS

Han T, Tu WW, Li YF. Explanation consistency training: Facilitating consistency-based semi-supervised learning with interpretability. InProceedings of the AAAI conference on artificial intelligence May 1, 20218 (vol. 35, No. 9, pp. 7639-7646). (Year: 2021).*
(Continued)

*Primary Examiner* — Kc Chen
(74) *Attorney, Agent, or Firm* — Amin, Turocy & Watson, LLP

(57) ABSTRACT

One or more systems, devices, computer program products and/or computer-implemented methods of use provided herein relate to incorporating explainability constraints into machine learning model training. A computer-implemented system can comprise a memory that can store computer executable components. The computer-implemented system can further comprise a processor that can execute the computer executable components stored in the memory, wherein the computer executable components can comprise a training component that can train a machine learning model using an objective function that can be modified to incorporate an explainability metric for the machine learning model in addition to a model performance metric of the machine learning model.

20 Claims, 14 Drawing Sheets
(5 of 14 Drawing Sheet(s) Filed in Color)

(56) References Cited

U.S. PATENT DOCUMENTS

| | | | |
|---|---|---|---|
| 2020/0151516 | A1 | 5/2020 | Anushiravani et al. |
| 2020/0167677 | A1 | 5/2020 | Verma et al. |
| 2021/0133630 | A1 | 5/2021 | Dalli et al. |
| 2022/0058531 | A1 | 2/2022 | Ding et al. |
| 2022/0147876 | A1 | 5/2022 | Dalli et al. |
| 2022/0374703 | A1 | 11/2022 | Rigotti et al. |

OTHER PUBLICATIONS

Ross, Andrew Slavin; Hughes, Michael C.; Doshi-Velez, Finale. "Right for the Right Reasons: Training Differentiable Models by Constraining their Explanations." Proceedings of the 26th International Joint Conference on Artificial Intelligence (IJCAI 2017), pp. 2662-2670; May 25, 2017. (Year: 2017).*

Molnar, Christoph. "Interpretable Machine Learning: A Guide for Making Black Box Models Explainable." Leanpub, 1st edition, published Feb. 21, 2019; chapter "Model-Agnostic Methods" section "Feature Importance", pp. 154-158. (Year: 2019).*

Hind, M. et al. | "TED: Teaching AI to Explain its Decisions." arXiv:1811.04896v2 [cs.AI] Jun. 15, 2019, 7 pages.

Heo, J. et al. | "Fooling Neural Network Interpretations via Adversarial Model Manipulation." arXiv:1902.02041v3 [cs.LG] Nov. 1, 2019, 18 pages.

Dombrowski, A.-K. et al. | "Explanations can be manipulated and geometry is to blame." arXiv:1906.07983v2 [stat.ML] Sep. 25, 2019, 34 pages.

Erion, G. et al. | "Improving performance of deep learning models with axiomatic attribution priors and expected gradients." arXiv: 1906.10670v2 [cs.LG] Nov. 11, 2020, 39 pages.

Hickey, J. M. et al. | "Fairness by Explicability and Adversarial SHAP Learning." arXiv:2003.05330v3 [cs.LG] Jun. 26, 2020, 17 pages.

Goldsteen, A. et al. | "Reducing Risk of Model Inversion Using Privacy-Guided Training." arXiv:2006.15877v1 [cs.LG] Jun. 29, 2020, 12 pages.

Chefer, H. et al. | "Optimizing Relevance Maps of Vision Transformers Improves Robustness." arXiv:2206.01161v1 [cs.CV] Jun. 2, 2022, 33 pages.

Bhatt, U. et al. | "Evaluating and Aggregating Feature-based Model Explanations." Proceedings of the Twenty-Ninth International Joint Conference on Artificial Intelligence (IJCAI-20), Jul. 11, 2020, 13 pages.

Google Guides | "Introduction to Vertex Explainable AI." Website https://cloud.google.com/vertex-ai/docs/explainable-ai/overview, updated Mar. 20, 2023, last accessed Mar. 21, 2023, 18 pages.

EXplainable Random Forest Mar. 2023 (8 pages.).

* cited by examiner

700

750

760

770

INCORPORATING EXPLAINABILITY CONSTRAINTS INTO MACHINE LEARNING MODEL TRAINING

STATEMENT REGARDING PRIOR DISCLOSURES BY THE INVENTOR OR A JOINT INVENTOR

The following disclosures are submitted under 35 U.S.C. 102(b)(1)(A):

DISCLOSURE: [eXplainable Random Forest, Shlomit Gur, Guy Amit, Mar. 15, 2023].

BACKGROUND

The subject disclosure relates to machine learning and, more specifically, to incorporating explainability constraints into machine learning model training.

Machine learning models can be widely adopted in many domains, such as healthcare and finance, which can be attributed to an increase in performance at the cost of increased model complexity. Complex machine learning models can provide more accurate predictions and can be harder to explain to users as compared to simpler models. Existing methods suggested for explaining machine learning models can often be suitable for use after a model has been trained. Furthermore, explanations provided by these methods can include features that are not human-understandable, which in turn can hinder comprehension of reasoning of a model by a user. Considering feature-based explainability during training of machine learning models can result in models that can produce more meaningful and valid explanations.

The above-described background description is merely intended to provide a contextual overview regarding explainability of machine learning models, and is not intended to be exhaustive.

SUMMARY

The following presents a summary to provide a basic understanding of one or more embodiments described herein. This summary is not intended to identify key or critical elements, delineate scope of particular embodiments or scope of claims. Its sole purpose is to present concepts in a simplified form as a prelude to the more detailed description that is presented later. In one or more embodiments described herein, systems, computer-implemented methods, apparatus and/or computer program products that can enable incorporating explainability constraints into machine learning model training are discussed.

According to an embodiment, a computer-implemented system can comprise a memory that can store computer executable components. The computer-implemented system can further comprise a processor that can execute the computer executable components stored in the memory, where the computer executable components can comprise a training component that can train a machine learning model using an objective function that can be modified to incorporate an explainability metric for the machine learning model in addition to a model performance metric of the machine learning model. Such embodiments of the system can provide a number of advantages, including that the machine learning model can balance a tradeoff between performance and explainability.

In one or more embodiments of the aforementioned system, a definition component can define feature preferences for the machine learning model, where defining the feature preferences can comprise defining respective levels of explainability for one or more features of training data of the machine learning model. In one or more embodiments of the aforementioned system, the feature preferences can be defined globally for the machine learning model or locally for one or more records of the training data. In one or more embodiments of the aforementioned system, a computation component can quantify explainability of the machine learning model based on the objective function, training data of the machine learning model and validation data of the machine learning model. In one or more embodiments of the aforementioned method, an update component can iteratively update a feature preference vector corresponding to the explainability of the machine learning model based on the computation component quantifying the explainability of the machine learning model. Such embodiments of the system can provide a number of advantages, including that the machine learning model trained using the modified objective function can desirably balance a tradeoff between performance and explainability, produce more meaningful and valid explanations and provide for explainable artificial intelligence (AI) rather than persuasive AI that can result from explanations relying strongly on human evaluation.

According to another embodiment, a computer-implemented method can comprise training, by a system operatively coupled to processor, a machine learning model using an objective function that can be modified to incorporate an explainability metric for the machine learning model in addition to a model performance metric of the machine learning model. Such embodiments of the computer-implemented method can provide a number of advantages, including that the method can improve a combined quality of explanations and predictions, such that resulting models can produce more meaningful and valid explanations.

One or more embodiments of the aforementioned computer-implemented method can comprise defining, by the system, feature preferences for the machine learning model, where defining the feature preferences can comprise defining respective levels of explainability for one or more features of training data of the machine learning model. In one or more embodiments of the aforementioned computer-implemented method, the feature preferences can be defined globally for the machine learning model or locally for one or more records of the training data. One or more embodiments of the aforementioned computer-implemented method can comprise quantifying, by the system, explainability of the machine learning model based on the objective function, training data of the machine learning model and validation data of the machine learning model. One or more embodiments of the aforementioned computer-implemented method can comprise updating, by the system, a feature preference vector corresponding to the explainability of the machine learning model based on the quantifying of the explainability of the machine learning model, where the updating can be iterative. Such embodiments of the computer-implemented method can provide a number of advantages including that the machine learning model trained using the modified objective function can desirably balance a tradeoff between performance and explainability, produce more meaningful and valid explanations and provide for AI rather than persuasive AI that can result from explanations relying strongly on human evaluation.

According to yet another embodiment, a computer program product for incorporating an explainability constraint into a decision tree ensemble, is provided. The computer program product can comprise a computer readable storage medium having program instructions embodied therewith, the program instructions executable by a processor to cause the processor to train, by the processor, a machine learning model using an objective function that can be modified to incorporate an explainability metric for the machine learning model in addition to a model performance metric of the machine learning model. Such embodiments of the computer-program product can provide a number of advantages, including improvements to a combined quality of explanations and predictions, such that resulting models can produce more meaningful and valid explanations.

One or more embodiments of the aforementioned computer program product can cause the processor to define, by the processor, feature preferences for the machine learning model, where defining the feature preferences can comprise defining respective levels of explainability for one or more features of training data of the machine learning model. In one or more embodiments of the aforementioned computer program product, the feature preferences can be defined globally for the machine learning model or locally for one or more records of the training data. One or more embodiments of the aforementioned computer program product can cause the processor to quantify, by the processor, explainability of the machine learning model based on the objective function, training data of the machine learning model and validation data of the machine learning model. One or more embodiments of the aforementioned computer program product can cause the processor to update, by the processor, a feature preference vector corresponding to the explainability of the machine learning model based on the quantifying of the explainability of the machine learning model, where the updating can be iterative. Such embodiments of the computer program product can provide a number of advantages including that the machine learning model trained using the modified objective function can desirably balance a tradeoff between performance and explainability, produce more meaningful and valid explanations and provide for explainable AI rather than persuasive AI that can result from explanations relying strongly on human evaluation.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
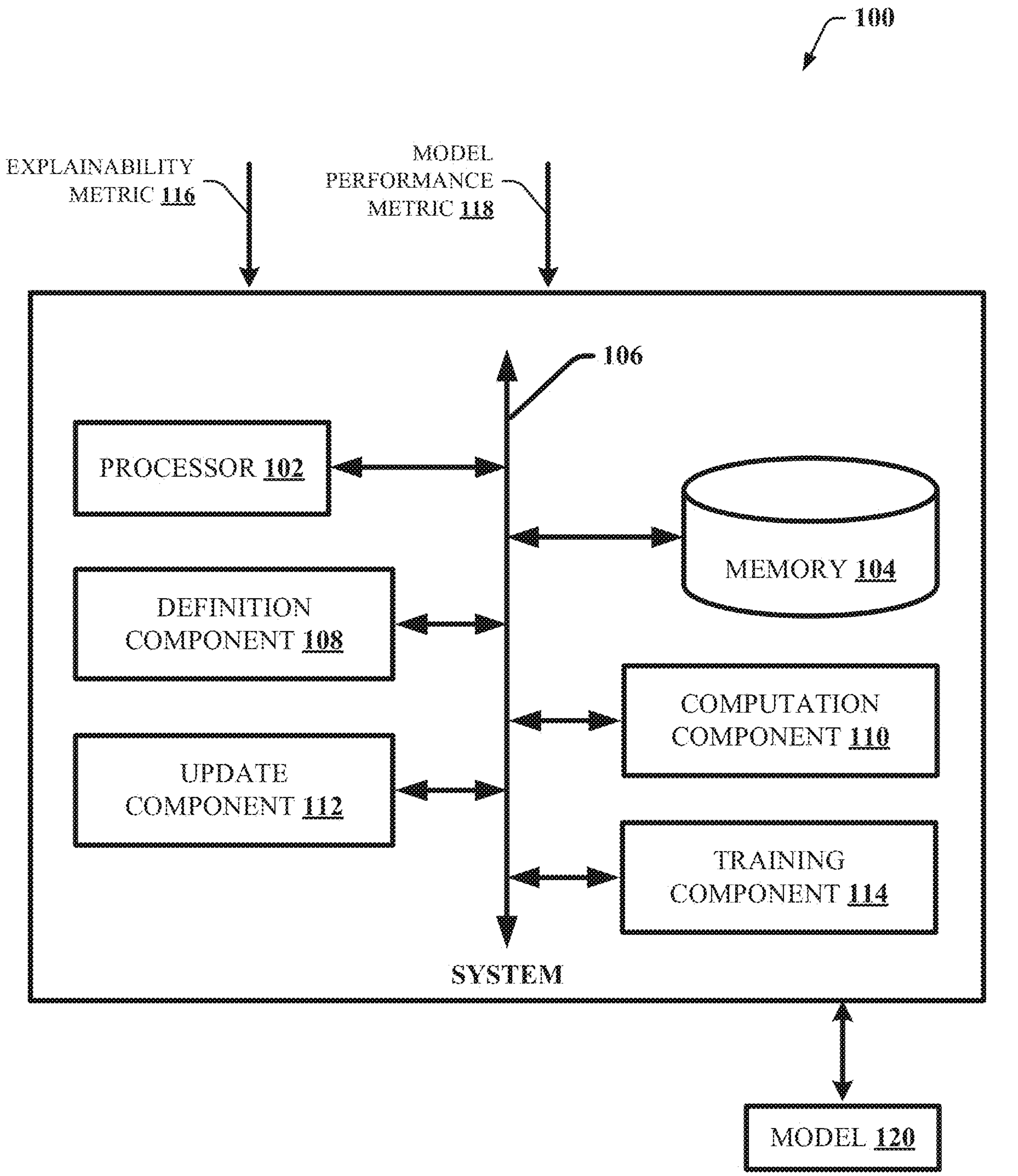
FIG. 1 illustrates a block diagram of an example, non-limiting system that can train a machine learning model using an objective function modified to incorporate explainability constraints for the machine learning model in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

In recent years AI has been widely adopted in many domains and aspects of lives, such as healthcare, finance, games, and other complex cognitive tasks. Such wide adoption can be attributed to improved performance of AI models, which has been made possible by increasingly complex, and therefore, increasingly difficult to explain models. However, the goal of such AI models is often to aid or make decisions for humans, which gives cause for concern, especially in domains with potentially severe individual or societal consequences. For example, the use of machine learning algorithms in healthcare to predict a medical outcome or a diagnosis can raise concerns regarding the reliability, trustworthiness, and ethics of the machine learning algorithms/models, especially in terms of characteristics of patients that the models/algorithms can rely on.

Such concerns have spurred public debates, giving rise to legislation and high-volume research in the domain of eXplainable Artificial Intelligence (XAI). XAI refers to an ability to understand and interpret a decision-making process involving an AI model. XAI can serve multiple purposes including increasing trust and accountability in AI-based systems, which can be imperative in high-stakes applications with potentially severe individual or societal consequences (e.g., judicial, health-related, or financial decisions). Some machine learning models can be interpretable, that is, their inner workings can be inherently human-understandable (e.g., decision trees), however, such models can often be simple and not perform well on real-world complex tasks. Conversely, machine learning models that can yield good performance on real-world tasks can usually be complex and not interpretable. Complex machine learning models can provide more accurate predictions than simple models but can be harder to explain to users as compared to simpler models, which can be problematic in high-stake decision-making scenarios. Many existing XAI approaches can be predominantly post hoc. For example, some XAI approaches can only deem a machine learning model explainable or not explainable, after the machine learning model has been trained. If the machine learning model can be deemed not explainable, there can often not exist any known course of action to rectify it. While other machine learning models, modification of hyperparameters, or modification of the training data can be implemented, such options are not guided by a form of explainability. Some exceptions to this rule can include data-type-specific (often unstructured data) methods for Deep Neural Networks (DNNs) and methods for teaching an AI to explain decisions. However, such exceptions are not applicable to structured data without predefined explanations.

More specifically, existing techniques towards explainability, such as a method that proposes using a Probabilistic Graphical Model to provide a local explanation, have introduced Bayesian aspects to XAI techniques such as Local Interpretable Model-Agnostic Explanations (LIME) and Shapley Additive exPlanations (SHAP). However, these methods can be post-hoc and not account for explainability during the training of the model. Another technique to improve explainability of a machine learning model during training can involve predicting both a label and an explanation from a predefined set of explanations using a multi-label classifier trained to predict an original label coupled with the explanation. Such a technique can be model-neutral and can be applied to models capable of performing multi-label classification, however, the technique can suffer from the limitations that the training set needs to include both labels and explanations, no new explanations outside the predefined set can be learned from the data, and there can be no way to prevent a predicted explanation from contradicting features in an explained data point.

Some other existing techniques can be model specific as opposed to being model neutral. For example, in one technique an Adaboost ensemble can be trained to enforce fairness of a model. In this approach the weights of the samples used for training each weak learner can be chosen while considering SHAP values. In each iteration, a surrogate model can be fitted in addition to a weak learner and the SHAP values from the surrogate model are used together with the weak learner error rate to update the weights of the training samples. Another model specific approach can relates to the domain of data protection. Although meant for enforcing data protection needs, the approach can be directed towards explainability of a decision tree. For example, some of the dataset features can be considered more sensitive and encouraged to be used less, to protect against Membership Inference attacks. This approach can extend a training process of a decision tree, such that in each feature split a predefined weight can be considered in addition to an entropy score. This training process can yield a decision tree whose feature importance (FI) values can be aligned with the data protection needs defined by a user. However, this approach does not provide a user with any way to balance the performance of the model with the data protection needs. Introducing explainability to machine learning models is usually discussed in the context of supervised prediction models, but a recent line of work introduces methods for unsupervised algorithms as well. A recent paper proposed a methodology for making clustering algorithms, specifically K-means and K-medians, more explainable, by converting them to decision trees. After the initial training of the clustering algorithm, the assigned cluster label is used as a label for creating a decision tree, which is an interpretable machine learning model. Still another technique (based on unsupervised prediction models) for making clustering algorithms, specifically K-means and K-medians, more explainable, can comprise converting them to decision trees. In this technique, after the initial training of the clustering algorithm, the assigned cluster label can be used as a label for creating a decision tree, which can be an interpretable machine learning model. Similar to some other existing approaches discussed above, this technique can also not provide an entity or user with any way to influence explainability of the model.

Thus, existing approaches towards explainability in machine learning models can either suffer from being post-hoc (e.g., approaches based on implementation of user-interpretable (inherently explainable) models (e.g., Decision trees, Naive Bayes) or developing an explainer component after training a model (i.e., "after the fact")), wherein a machine learning model is already fully trained and cannot be changed at the time an explanation is generated, or the explanations are limited to a pre-defined set of explanations (e.g., approaches based on developing an explainer component during training of a model (i.e., "side by side")), which can limit possible data-driven insight into explanations and thereby the data. The latter approach can also rely on training data with both, labels and explanations, from the explanations set. Explainability is still in early stages of research and on the other hand the demand for good explanations for AI is significant. Efficient and trustworthy XAI requires balancing a tradeoff between completeness and human-understandability of the explanation. While complete explanations can often be too complex for a human agent to comprehend, thereby missing the goal of human-understandability, explanations relying strongly on human evaluation can result in persuasive systems rather than explainable systems.

Given problems described above with existing approaches towards incorporating explainability in AI, various embodiments of the present disclosure can be implemented to produce a solution to these problems by considering feature-based explainability during training of machine learning models. Embodiments described herein include systems, computer-implemented methods, apparatus and computer program products that can incorporate explanation considerations and constraints into training of a prediction model. Explainable AI in this context can refer to explanation of a complex machine learning model. A model not trained to be explainable (e.g., trained without taking into account the explainability of the model) can risk generating persuasive AI rather than explainable AI. For example, various embodiments discussed herein provide eXplainable Random Forest (XRF), a method for incorporating a form of predefined explainability into training of Random Forest (RF) models. XRF can be a family of decision tree ensemble models that can optimize a balance between a performance metric (e.g., accuracy or F1 score) and a predefined form of explainability during training. The predefined explainability can be a global feature preference vector, which can be provided as input to a machine learning model by an entity (e.g., by a hardware, software, machine, AI, or by a user via a GUI). As stated elsewhere herein, feature preferences can be dependent on the entity and can be based on, for example, human-understandability or political correctness of the features. In an embodiment, the method can be viewed as a user-driven "soft" feature selection, wherein, unlike traditional feature selection, all the features remain available for the machine learning model to use. The objective of the proposed method can be to foster a sound tradeoff between performance of the machine learning model and explainability of the machine learning model, as defined by adherence of feature importance (FI) values of the machine learning model to the feature preference vector. For example, if a feature does not hold great predictive power, a strong preference to the feature will not inflate importance of the feature in the model at a great cost to performance. Alternatively, a high-importance feature with a negative predefined preference can be substituted by another feature or a set of features, despite performance of the model being affected. That is, one or more embodiments herein can allow an entity to determine a degree to which the model should prioritize explainability over performance (or performance over explainability). One or more embodiments discussed herein can be applicable to structured data without predefined explanations.

Various embodiments herein describe a systematic method that can challenge FI values generated by an RF model to quantify the explainability without human involvement. For example, a testing method employed by one or more embodiments herein can encourage the model to use features with lowest FI values and discourage the use of features with greatest FI values. The generality of the method allowed for experimental verification of the applicability of the method using multiple benchmark datasets in a manner that is neither dataset, nor domain specific. As stated earlier, various embodiments discussed herein introduce an XRF method, an extension of RF that can balance performance and predefined explainability (e.g., explainability constraints stemming from the users' view of the problem) during training, introduce an "eXplainability Score" (denoted by XS) as a metric to quantify explainability, demonstrate a tradeoff of the XRF method between performance of the model and explainability of the model on six benchmark datasets, and demonstrate that the number of trees in the XRF model does not have a strong effect on the explainability of the model.

In one embodiment, predefined feature preferences (based on how appropriate or human-understandable they can be) can be included in the explanation considerations. That is, feature preferences can indicate features that a model can be rewarded for relying heavily on (giving them greater weight) for prediction and features that the model can be penalized for relying heavily on. The feature preferences can be predefined by a user or domain expert. In an embodiment, the feature preferences can be predefined by a hardware, software, machine or AI. In one embodiment, the feature preferences can be defined globally. For example, given training data (x, y), wherein x can comprise vectors of size m and y can represent respective labels of the vectors, and given a feature preference vector v of size m, a machine learning model, M, can be trained using an objective function that can incorporate both the performance of the machine learning model (accuracy, F1 score (described with respect to the figures), etc.) and explainability of the machine learning model as defined by adherence of feature importance of the machine learning model to the feature preference vector (e.g., cosine similarity) with a scalar, λ. The globally defined feature preference vector v can be independent from x, such that v can be the same for each x. The scalar, λ can represent a ratio between explainability (denoted by "g") of the machine learning model and performance (denoted by "f") of the machine learning model. In another embodiment, the feature preferences can be defined locally. For example, given training data (x, y, $v_x$), wherein x and y can be as described above and $v_x$ can represent respective (local) feature preference vectors of x, the machine learning model can be trained using an objective function that can incorporate a performance metric of the machine learning model and an explainability metric for the machine learning model, with the exception that an explainability term representative of the explainability metric can be instance specific due to defining the feature preferences locally. The instance specific feature preference vector $v_x$ can be different for each x, contrary to the feature preference vector v described earlier.

In another embodiment, the machine learning model can be trained on a training set, followed by quantification of the explainability of the machine learning model on a validation set, followed by continued training of the machine learning model on the training set based on quantification results of the explainability. That is, instead of the feature preferences being pre-defined, the feature preferences can be learned from an explanation quantification. Following similar principles as described in the previous embodiment, with the difference that the vector representing the feature preference can be generated dynamically from the output of the XAI method (e.g., SHAP) on a validation set, instead of being provided as an input in advance. The output of the XAI method can be quantified and used to update the dynamic feature preference vector. In turn, the dynamic feature preference vector can be used in a similar manner to that described in the previous embodiment. The iterations can repeat until either stability is reached (e.g., change in the objective function is smaller than epsilon (ε)→0) or maximum number of iterations have been reached. Herein, F can denote the smallest quantity, for example, a term that can be taken as zero in some limit. In layman terms, F can be a very small (positive) real number.

XAI methods can be used to make complex machine learning models explainable, wherein explainable machine learning models can be models whose inner workings (that might not be human-understandable) can be explained using proxies (e.g., feature importance of surrogate interpretable models). XAI methods for machine learning models can be categorized into local, global, and hybrid methods. When aiming to provide an explanation for a specific model prediction, local explanation methods (e.g., LIME or SHAP) can be used, wherein such methods can usually provide an explanation in the form of a list, indicating respective contributions of individual features to a particular prediction. In contrast, for explaining global (i.e., population-wise) patterns in a model, global XAI methods can be used, wherein such methods can explain a machine learning model over an entire input space, as captured by the training data. One or more embodiments herein can focus on adjusting global explanations provided by XRF models to fit user needs. Further, in one or more embodiments herein, genetic algorithms (GAs) can be used as a tool for optimization of a parametric non-differentiable function. Formally, given a function for maximization (or minimization), $f(\theta)$, a GA can search for a solution (individual) $\hat{\theta}$ such that $f(\theta)$ can be maximal (or minimal). GAs are a family of gradient-free optimization algorithms inspired by the mechanics of natural selection and genetics. GAs can solve a variety of optimization and search problem. GAs can encode the solution space of a problem as a set of individuals (i.e., a population) followed by repeatedly applying genetic operators such as selection, crossover (recombination), and mutation in order to make the individuals (i.e., solutions) evolve with an end goal of finding a sufficient solution to the problem.

In sum, the various embodiments described herein relate to methods for incorporating a form of explainability constrain into training of decision tree ensembles through modification of an objective function used to train the decision tree ensembles. That is, a machine learning model can be trained to maximize dual objectives of model performance (e.g., F1 score) of the machine learning model and explainability of the machine learning model based on a metric accounting for the explainability. The various embodiments described herein can implement two methods for achieving the above. In a first method, feature preferences can be defined for explainability, for example, by defining features that are more explainable (i.e., features that the model can rely on more heavily if possible), features that are not explainable (i.e., feature that the model can rely on as little as possible), and features that are neutral (i.e., features that have no explanation-related preference). The feature preferences can be defined either globally for the model or locally (per record). In a second method, the explainability can be quantified and balanced iteratively (e.g., SHAP-based global feature importance can be consistent/comparable between random subsamples, such as training and validation sets, if a model is explainable) instead of being provided as an external input to the machine learning model. The various embodiments of the present disclosure can target tabular data. The methods discussed herein can be developed and embedded into commercial products. For example, the methods described by the various embodiments herein can be used in financial products such as credit and risk score determination and insurance claims adjudication, as well as AI-powered solutions in asset and facility management, logistics, travel, etc. As stated elsewhere herein, the various embodiments of the present disclosure can provide a number of advantages including that the machine learning model trained using the modified objective function can desirably balance a tradeoff between performance and explainability, produce more meaningful and valid explanations and provide for explainable AI rather than persuasive AI that can result from explanations relying strongly on human evaluation.

The embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting systems described herein, such as non-limiting system 100 as illustrated at FIG. 1, and/or systems thereof, can further comprise, be associated with and/or be coupled to one or more computer and/or computing-based elements described herein with reference to an operating environment, such as the operating environment 1000 illustrated at FIG. 10. For example, system 100 can be associated with, such as accessible via, a computing environment 1000 described below with reference to FIG. 10, such that aspects of processing can be distributed between system 100 and the computing environment 1000. In one or more described embodiments, computer and/or computing-based elements can be used in connection with implementing one or more of the systems, devices, components and/or computer-implemented operations shown and/or described in connection with FIG. 1 and/or with other figures described herein.

FIG. 1 illustrates a block diagram of an example, non-limiting system 100 that can train a machine learning model using an objective function modified to incorporate explainability constraints for the machine learning model in accordance with one or more embodiments described herein. System 100 can comprise processor 102, memory 104, system bus 106, definition component 108, computation component 110, update component 112, and training component 114.

The system 100 and/or the components of the system 100 can be employed to use hardware and/or software to solve problems that are highly technical in nature (e.g., related to machine learning, explainability, etc.), that are not abstract and that cannot be performed as a set of mental acts by a human. Further, some of the processes performed may be performed by specialized computers for carrying out defined tasks related to the machine learning, explainability, etc.

Discussion turns briefly to processor 102, memory 104 and bus 106 of system 100. For example, in one or more embodiments, the system 100 can comprise processor 102 (e.g., computer processing unit, microprocessor, classical processor, and/or like processor). In one or more embodiments, a component associated with system 100, as described herein with or without reference to the one or more figures of the one or more embodiments, can comprise one or more computer and/or machine readable, writable and/or executable components and/or instructions that can be executed by processor 102 to enable performance of one or more processes defined by such component(s) and/or instruction(s).

In one or more embodiments, system 100 can comprise a computer-readable memory (e.g., memory 104) that can be operably connected to the processor 102. Memory 104 can store computer-executable instructions that, upon execution by processor 102, can cause processor 102 and/or one or more other components of system 100 (e.g., definition component 108, computation component 110, update component 112, and/or training component 114) to perform one or more actions. In one or more embodiments, memory 104 can store computer-executable components (e.g., definition component 108, computation component 110, update component 112, and/or training component 114).

System 100 and/or a component thereof as described herein, can be communicatively, electrically, operatively, optically and/or otherwise coupled to one another via bus 106. Bus 106 can comprise one or more of a memory bus, memory controller, peripheral bus, external bus, local bus, and/or another type of bus that can employ one or more bus architectures. One or more of these examples of bus 106 can be employed. In one or more embodiments, system 100 can be coupled (e.g., communicatively, electrically, operatively, optically and/or like function) to one or more external systems (e.g., a non-illustrated electrical output production system, one or more output targets, an output target controller and/or the like), sources and/or devices (e.g., classical computing devices, communication devices and/or like devices), such as via a network. In one or more embodiments, one or more of the components of system 100 can reside in the cloud, and/or can reside locally in a local computing environment (e.g., at a specified location(s)).

In addition to the processor 102 and/or memory 104 described above, system 100 can comprise one or more computer and/or machine readable, writable and/or executable components and/or instructions that, when executed by processor 102, can enable performance of one or more operations defined by such component(s) and/or instruction(s). For example, in an embodiment, training component 114 can train a machine learning model (e.g., model 120) using an objective function modified to incorporate an explainability metric (e.g., explainability metric 116) for the machine learning model in addition to a model performance metric (e.g., model performance metric 118) of the machine learning model. Incorporating explanation considerations and constraints into training of the machine learning model by using the modified objective function can be implemented via two methods, as described below.

In an embodiment, predefined feature preferences (based on how appropriate or human-understandable a feature is) can be included in the explanation considerations. The feature preferences can be predefined by a user or domain expert (e.g., via a graphical user interface (GUI)), for example, wherein the user or the domain expert can indicate to model 120, features that model 120 can be rewarded for relying heavily on (giving greater weight to the features) for making predictions and features that model 120 can be penalized for relying heavily on (giving lesser weight to the features). For example, features relating to sensitive social groups or social matters can be assigned less weight, politically correct features can be assigned more weight, etc. In another example, features can be assigned weight based on prior knowledge of the features. For example, features known to be useful but predictive can be assigned less weight. In yet another example, to build a model that an end user can understand, features applicable to a machine learning technician can be assigned lesser weight in comparison to features applicable to the end user. In an embodiment, the feature preferences can be predefined by a hardware, software, machine, or AI. For example, definition component 108 can define feature preferences for the machine learning model (e.g., model 120, XRF model). Defining the feature preferences can comprise defining respective levels of explainability for one or more features of training data of the machine learning model. That is, the explainability of the model 120 can be defined by adherence of feature importance of the machine learning model to feature preference vectors. Defining feature preferences can be GUI dependent. The feature preferences can be defined globally for model 120 or locally for one or more records of the training data, as described below. A feature preference vector can help to shape construction of explanations (rather than dictating explanations). The feature preferences that can help to shape the explainability can be homogenous (e.g., global) or heterogenous (e.g., local) across a training space.

In one embodiment, the feature preferences can be defined globally for a dataset. For example, given training data (x, y), wherein x can comprise vectors of size m and y can represent respective labels of the vectors, and given a feature preference vector v of size m, a machine learning model, M (e.g., model 120, XRF model), can be trained using an objective function that can incorporate both, the performance of M, and explainability of M as defined by adherence of feature importance of M to the feature preference vector, v, with a scalar, λ. The objective function can be as described in Equation 1. The scalar, λ, can define an extent to which the model can weigh the explainability versus the performance. For example, setting λ to zero, can indicate to the model that only the performance of the machine learning model is to be considered for making predictions. Further, λ can represent a ratio of the explainability (g) or importance of the explainability to the performance (f) or importance of the performance. For example, a value of positive 2 for λ (i.e., λ=2) can indicate to the model that explainability is to be given twice as much importance as the performance for a particular prediction task, thereby putting more emphasis on explainability, which can be at the cost of performance of the model. There can be different vector representations for the feature preference vectors, but the feature preference vectors can have the same length. Indices can be defined in a feature vector that the model can be encouraged to use, discouraged to use, and trained to be neutral about, based on mappings between the preferences and the actual features (e.g., a logic running within the machine learning model can determine local maxima or local minima). Defining feature preferences globally for a dataset can be similar to providing other parameters to the machine learning model. For example, in the case of a decision tree, an amount of trees to be used can be defined as hyperparameters. As discussed in one or more embodiments, the globally defined feature preference vector v can be independent from x, unlike locally defined feature preference vectors discussed below. For example, for a classification task, x can be a vector representing an animal, y can be a label assigned to the animal and v can be a feature preference vector associated with a feature such that v can be the same for each (x, y). For example, the type of tail or the type of whiskers on animals can be features used to distinguish between animals, and a feature preference can be defined such that more weight can be assigned to the type of tail rather than the type of whiskers for the training data, such that v can be the same for each (x, y).

$$\text{Objective function}\,(OF) = f(M(x)\mid y) + \lambda g(\upsilon_M \mid \upsilon), \qquad \text{Equation 1}$$

wherein $f(M(x)\mid y)$ is the model performance term and $\lambda g(\upsilon_M \mid \upsilon)$ is the explainability term.

In another embodiment, the feature preferences can be defined locally, given training data (x, y, $v_x$), wherein x can comprise vectors of size m, y can represent respective labels of the vectors, and $v_x$ can represent respective (local or instance specific) feature preference vectors of x. Continuing with the example of a classification task to distinguish between different types of animals, the type of tail can be a significant feature to distinguish between a cat and a dog, however, to distinguish between a dog and a kiwi bird, another feature can be more significant that the type of tail.

Thus, the type of tail or another feature can be an instance specific feature that can be locally defined for each x. As before, training component 114 can train a machine learning model (e.g., model 120) using an objective function that can incorporate a performance metric (e.g., model performance metric 118) of the machine learning model and an explainability metric (e.g., explainability metric 116) for the machine learning model (e.g., as described in equation 1), with the exception that the explainability term representing the explainability metric can be instance specific since the explainability term can be based on locally defined feature preferences. For example, the explainability term can be $g(v_{M(x)}|v_x)$, wherein $v_{M(x)}$ can represent a local instance specific feature vector. SHAP can be implemented to define feature preference vectors at the instance level. At the global level, a feature importance of the model can be relied upon, however, for defining feature preference vectors at the instance level, a feature importance method (e.g., XAI method) such as SHAP, LIME, etc. can be implemented to generate feature importance at an instance level to compare it to the training information. The instance specific feature preference vectors can be provided as part of the training data (e.g., $(x, y, v_x)$), such that every instance can have an explanation associated with it, and such that the instance specific feature vectors can be an extension of the data as opposed to being a hyperparameter.

In an embodiment, incorporating explanation considerations and constraints into training of a machine learning model (e.g., model 120) by using a modified objective function can be implemented by training the machine learning model on a training set, followed by quantification of the explainability of the machine learning model on a validation set, followed further by continuing training of the machine learning model on the training set based on quantification of the explainability. That is, instead of the feature preferences being predefined, the feature preferences can be learned from an explanation quantification. For example, computation component 110 can quantify explainability of model 120 based on the objective function, training data of model 120 and validation data of model 120. Thereafter, update component 112 can iteratively update a feature preference vector corresponding to the explainability of model 120 based on computation component 110 quantifying the explainability of model 120. Following similar principles as described in the previous embodiment, with the difference that the vector representing the feature preference can be generated dynamically from an output of an XAI on a validation set, instead of being provided as an input in advance. The output of the XAI method can be quantified and used to update the dynamic feature preference vector. In turn, the dynamic feature preference vector can be used in a similar manner to that described in the previous embodiment (e.g., by comparing to the feature importance of the machine learning model). The iterations can repeat until either stability is reached (e.g., change in the objective function is smaller than $\varepsilon \rightarrow 0$) or maximum number of iterations have been reached.

More specifically, the process can be iterative. There can be an initialization step, wherein all features can be used as existing, in a neutral manner, and the process can begin without taking explainability into consideration. Thereafter, model 120 can quantify explainability based on the XAI method. For example, computation component 110 can quantify explainability of model 120 based on the objective function, training data of model 120 and validation data of model 120. In an embodiment, an output of the XAI method can be a measure on just the validation data or the output can be a measure that can look for consistency or comparability between the training data and validation data on a property. The quantification of explainability can be defined differently for different uses. For example, explainability can be quantified as a product of how well the feature importance on a validation set (e.g., comprising data previously unseen by the machine learning model) can match the feature importance on the training set, such that explainability on a training dataset being too far off (e.g., based on a subjective determination) from explainability on the unseen data can indicate that the machine learning model can be generating explanations of a lower quality. In this regard, more emphasis can be assigned to some features and certain other features can be assigned less importance, to make feature importances of the two datasets (i.e., the training dataset and the validation dataset) more comparable. The explainability term can be neutral (e.g., meaningless) during the first iteration, and from subsequent iterations onwards, explanations can be used and feature preference vectors that can reflect the quantification of explainability can be defined for individual features of the training data. For example, update component 112 can iteratively update a feature preference vector corresponding to the explainability of model 120 based on computation component 110 quantifying the explainability of model 120. Training model 120 based on model performance metric 118 and explainability metric 116 can balance a performance of model 120 and explainability of model 120 in favor of the performance or the explainability. Additional aspects of the machine learning model and training employed in various embodiments discussed above (e.g., with respect to globally defining feature preferences for a dataset) are explained in greater detail below.

Explainable Random Forest

As discussed elsewhere herein, various embodiments of the present disclosure present an XRF model (e.g., model 120, a machine learning model) that can be an adaptation of an RF model, which can allow dependency of the model on specific features in the training data to be influenced by user preferences. More specifically, given a feature preference vector, FP, such that FP $\in \mathbb{R}^N$, the model can be adjusted to use all N features in the training data, while attempting to assign weight to features in accordance with FP. For example, considering a dataset with four features—a first feature that can be valuable to the user, a second feature that the user would like to avoid if possible, and third and fourth features that the user can be neutral about. Without loss of generality, assuming that the first feature can be a valuable one and the fourth feature can be the one to avoid, the FP vector can take the form [1, 0, 0, −1]. Training an XRF model can comprise two steps—a first step can comprise constructing decision trees (the FP vector can have no effect in this step), and a second step can comprise optimizing an objective function (equation 3) in respect to the FP vector. Both steps are described below.

Constructing the Decision Trees

As previously mentioned, XRF can be an extension of RF. The RF model employs a bagging method, wherein each decision tree in the RF can be constructed independently. During inference, all the decision trees can be used in a voting scheme to gain a final prediction from the ensemble. In RF, each decision tree can be given an equal weight and the prediction for a data point x can be computed as described by equation 2.

$$\hat{y} = \sum_{i=1}^{k} w_i \cdot t_i(x) = \frac{1}{k} \cdot \sum_{i=1}^{k} t_i(x), \qquad \text{Equation 2}$$

wherein $\hat{y}$ represents a prediction, k represents an amount of decision trees in RF, $t_i$ represents the $i^{th}$ decision tree, and $w_i$ is its weight. It is to be noted that in RF, $$w_i = \frac{1}{k} \text{ for all } 1 \le i \le k \in \mathbb{N}.$$

The Optimization Process

The FP vector can allow an entity (e.g., hardware, software, machine, AI or human user) to influence the model's use of the features. During the optimization process the FP vector can be taken into account, and weights of the decision trees, $w_1$ for $1 \le i \le k \in \mathbb{N}$, can be modified such that FI values of the XRF model can adhere to a specification in the FP vector as much as possible. Optimizing only for similarity between the FI values of the model and the FP vector can lead to a significant decrease in performance of the model (e.g., its F1 score, accuracy, etc.). To mitigate this effect, an objective function that can balance between the performance of the model and a similarity measure between FI values of the model and the input FP vector can be employed. The similarity measure can be referred to as the "eXplainability Score" denote by XS. Formally, the objective function of the XRF can be defined as:

$$OF(XRF, FP) = \text{performance}(XRF) + \alpha \cdot XS(FI, FP), \qquad \text{Equation 3}$$

wherein OF stands for objective function, α can be a hyperparameter controlling the similarity metric weight during the optimization process and FI can be the FI values of the XRF model.

It is to be noted that a representation of the FP vector should match a choice of XS (e.g., ability of XS to handle negative values or 0, XS assumes the values in the FP vector sum up to 1, etc.). For purposes of simplicity, feature preference values (e.g., $FP_i \in \mathbb{R}$) can be considered, such that the values can indicate to the model, features that the model should give preference to ($FP_i>0$), features that are to be avoided by the model ($FP_i<0$), and features that the model can use as needed (i.e., neutral preference, $FP_i=0$). One or more embodiments herein can use a cosine similarity measure for XS as defined by equation 4.

$$XS(FI, FP) = \frac{FI \cdot FP}{\|FI\| \cdot \|FP\|} \qquad \text{Equation 4}$$

It is to be noted that performance(XRF) can be bounded between zero and positive ones (i.e., 0 and 1) (for both the accuracy and the F1 score). Thus, it is imperative that XS be bounded between negative one and positive one (i.e., −1 and 1) (as is the case with cosine similarity) for the usefulness of the hyperparameter a (equation 3). To account for the user-defined FP vector, the method discussed herein can employ a GA 2.2 to maximize a value of the objective function. The GA can search for the weights of the decision trees, $\mathcal{W}$=[w1, . . . , wk], to maximize the objective function, which can be mathematically represented as:

$$\max_{w} OF(XRF, PF).$$

In one or more embodiments herein, a simple version of the GA can be employed. CxOnePoint crossover operator, a tournament selection, and an additive Gaussian noise as a mutation operator can be employed. A grid search over hyperparameters of the GA (three right-most columns in Table 2) can be performed and the values can be selected based on XRF with α=0, such that OF on the validation set can be maximal.

To ensure that $$\sum_{i=1}^{k} w_i = 1,$$

which can be a requirement in RF, a normalization strategy can be used in one or more embodiments herein. The normalization can be applied each time the GA calculates the OF, as well as when the final weights for the decision trees are returned by the optimization process. In one or more embodiments herein, a softmax transform function can be used to normalize the weights as given by equation 5. The effect of a different normalization strategy and a different XS was also examined and has been described at least with reference to FIGS. 7B-7D.

$$\widehat{W_t} = \frac{e^{w_i}}{\sum_{j=1}^{k} e^{w_j}} \qquad \text{Equation 5}$$

Figure 2:
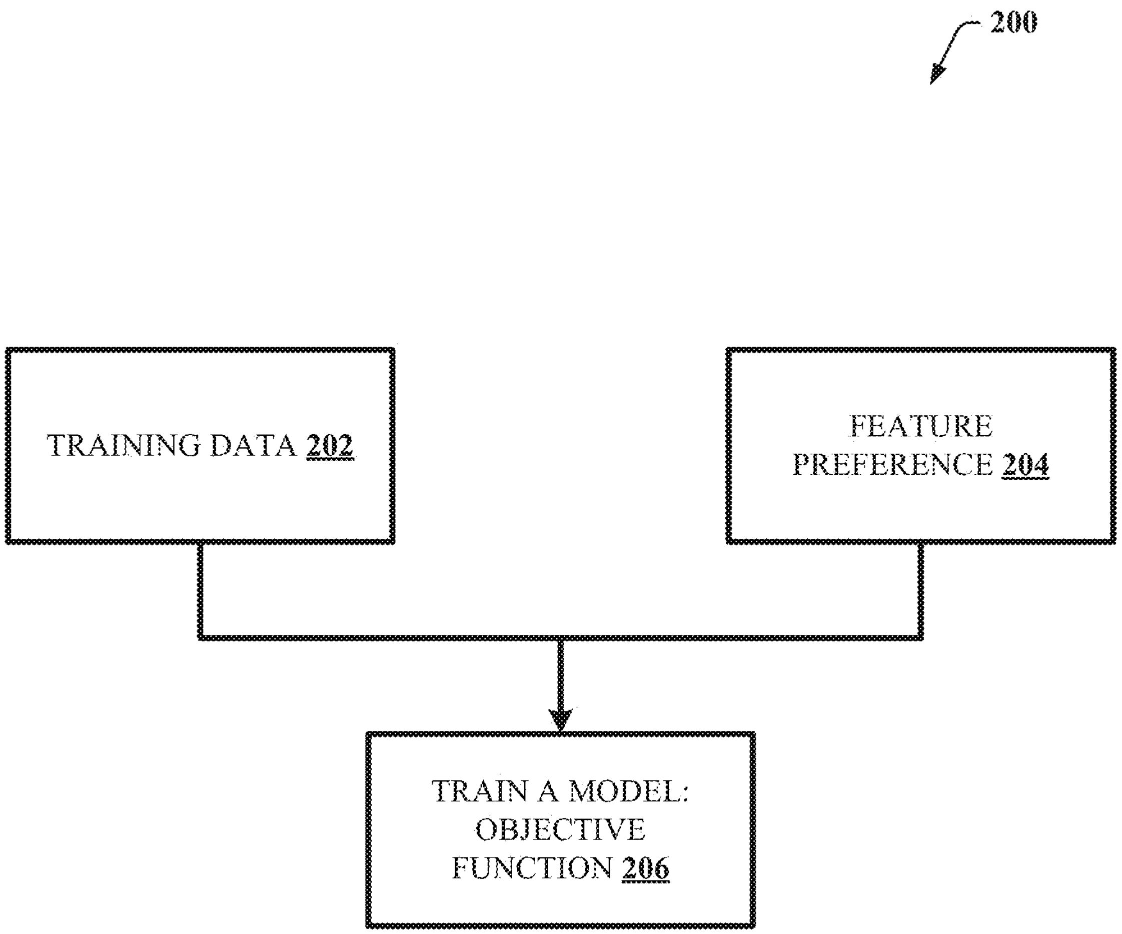
FIG. 2 illustrates a flow diagram of an example, non-limiting method that can train a machine learning model using an objective function modified to incorporate explainability constraints for the machine learning model in accordance with one or more embodiments described herein.

FIG. 2 illustrates a flow diagram of an example, non-limiting method 200 that can train a machine learning model using an objective function modified to incorporate explainability constraints for the machine learning model in accordance with one or more embodiments described herein. Non-limiting method 200 can be analogous to non-limiting method 100. Repetitive description of like elements and/or processes employed in respective embodiments is omitted for sake of brevity.

One or more embodiments herein can be used for incorporating explanation considerations and constraints into training of a machine learning model by using a modified objective function can be implemented. In an embodiment, predefined feature preferences can be included in the explanation considerations. The feature preferences can be predefined by a user or domain expert, for example, wherein the user or the domain expert can indicate the features that the model can be rewarded for relying heavily on (giving greater weight to the features) for making predictions and the features that the model can be penalized for relying heavily on (giving lesser weight to the features) for making the predictions. In an embodiment, the feature preferences can be pre-defined by a hardware, software, machine, or AI. For example, definition component 108 (FIG. 1) can define feature preferences for the machine learning model (e.g., model 120). Defining the feature preferences can comprise defining respective levels of explainability for one or more features of training data of the machine learning model. The explainability of the machine learning model can be defined by adherence of feature importance of the machine learning model to feature preference vectors. The feature preferences can be defined globally for the machine learning model or locally for one or more records of the training data, as described below.

In one embodiment, the feature preferences can be defined globally for a dataset. For example, given training data 202 (e.g., (x, y)), wherein x can comprise vectors of size m and y can represent respective labels of the vectors, and given a feature preference vector v (wherein $v \in \mathbb{R}^m$) of size m corresponding to a feature preference 204 for training data 202, a machine learning model (e.g., model 120 of FIG. 1) can be trained (e.g., by training component 114 of FIG. 1) using objective function 206 that can incorporate a performance of the machine learning model, and explainability of the machine learning model. The explainability can be defined by adherence of feature importance of the machine learning model to the feature preference vector, v, with a scalar, λ. The scalar, λ, can define an extent to which the model can weigh the explainability versus the performance. For example, setting λ to zero, can indicate to the model that only the performance of the machine learning model is to be considered for making predictions. Further, λ can represent a ratio of the explainability to the performance. For example, a value of positive 2 (i.e., λ=2) can indicate to the model that explainability is to be given twice as much importance as the performance for a particular prediction task, thereby putting more emphasis on explainability, which can be at the cost of performance of the model. As stated elsewhere herein, there can be different vector representations for the feature preference vectors, but the feature preference vectors can have the same length. Indices can be defined in a feature vector that the model can be encouraged to use, discouraged to use, and asked to be neutral about based on mapping between the preferences and the actual features. Defining feature preferences (e.g., feature preference 204) globally for a dataset can be similar to providing other parameters to the machine learning model. For example, in the case of a decision tree, an amount of trees to be used can be defined as hyperparameters. The globally defined feature preference vector v can be independent from x, unlike locally defined feature preference vectors discussed below. For example, for a classification task, x can be a vector representing an animal, y can be a label assigned to the animal and v can be a feature preference vector associated with a feature such that v can be the same each (x, y). For example, the type of tail or the type of whiskers on animals can be features used to distinguish between animals, and the feature preference v can be defined such that more weight can be assigned to the type of tail rather than the type of whiskers for each (x, y).

The explainability term can allow the machine learning model (e.g., model 120 of FIG. 1) to balance a tradeoff between the performance and explainability. The model can attempt to maximize or minimize objective function 206. For example, when trying to maximize objective function 206, instead of trying to maximize based only on the performance, the model can be trained to consider the explainability as well, similar to adding constraints for the model. Modifying the objective function can slightly modify an objective of training of a machine learning model. The objective function can take training data 202 and/or feature preference vectors as input and an inner logic of the machine learning model can minimize or maximize objective function 206. Different models can minimize or maximize respective objective functions in different ways so that even within a decision tree ensemble, there can be different methods of optimizing the objective function.

For the XRF model, an evolutionary algorithm called Distributed Evolutionary Algorithms in Python (DEAP) can be used wherein the objective function can be used to evaluate fitness of an individual (a suggested weights vector). An example of another algorithm to maximize the objective function can be as described by algorithm 1.

Algorithm 1: # Initialize random weight for every feature

```
W_0 = randn(d)
for i in range(max_iterations):
  # Compute OF for W_i
  OF_i = OF(X|W_i)
  # Compute gradient
  grad = d(OF_i)/d(X)
  # Update weights
  W_i+1 = W_i + learning_rate * grad
  # Check for convergence
  If ||grad|| < tolerance:
    break
```

In another embodiment, the feature preferences can be defined locally given training data 202 (i.e., (x, y, $v_x$)), wherein x can comprise vectors of size m, y can represent respective labels of the vectors, and $v_x$ can represent respective (local or instance specific) feature preference vectors of x. Continuing with the example of the classification task to distinguish between different types of animals, the type of tail of animals can be a significant feature to distinguish between a cat and a dog, however, to distinguish between a dog and a walrus, the type of whiskers can be more significant that the type of tail. Thus, the type of tail, the type of whiskers, or yet another feature can be instance specific features that can be locally defined for each x. As before, training component 114 (FIG. 1) can train the machine learning model (e.g., model 120 of FIG. 1) using objective function 206 that can incorporate a model performance term for the machine learning model and an explainability term for the machine learning model (e.g., as described in equation 1), with the exception that the explainability term can be instance specific since the explainability term can be based on locally defined feature preferences (e.g., feature preference 204). For example, the explainability term in equation 1 can be $\lambda g(v_{M(x)}|v_x)$, wherein $v_{M(x)}$ can represent a local instance specific feature vector. For defining feature preference vectors at the instance level, a feature importance method such as SHAP, LIME, etc. can be implemented to generate feature importance at an instance level to compare it to the training information. The instance specific feature preference vectors can be provided as part of training data 202 (e.g., (x, y, $v_x$)), such that every instance can have an explanation associated with it, and such that the instance specific feature vectors can be an extension of the data as opposed to being a hyperparameter.

Figure 3:
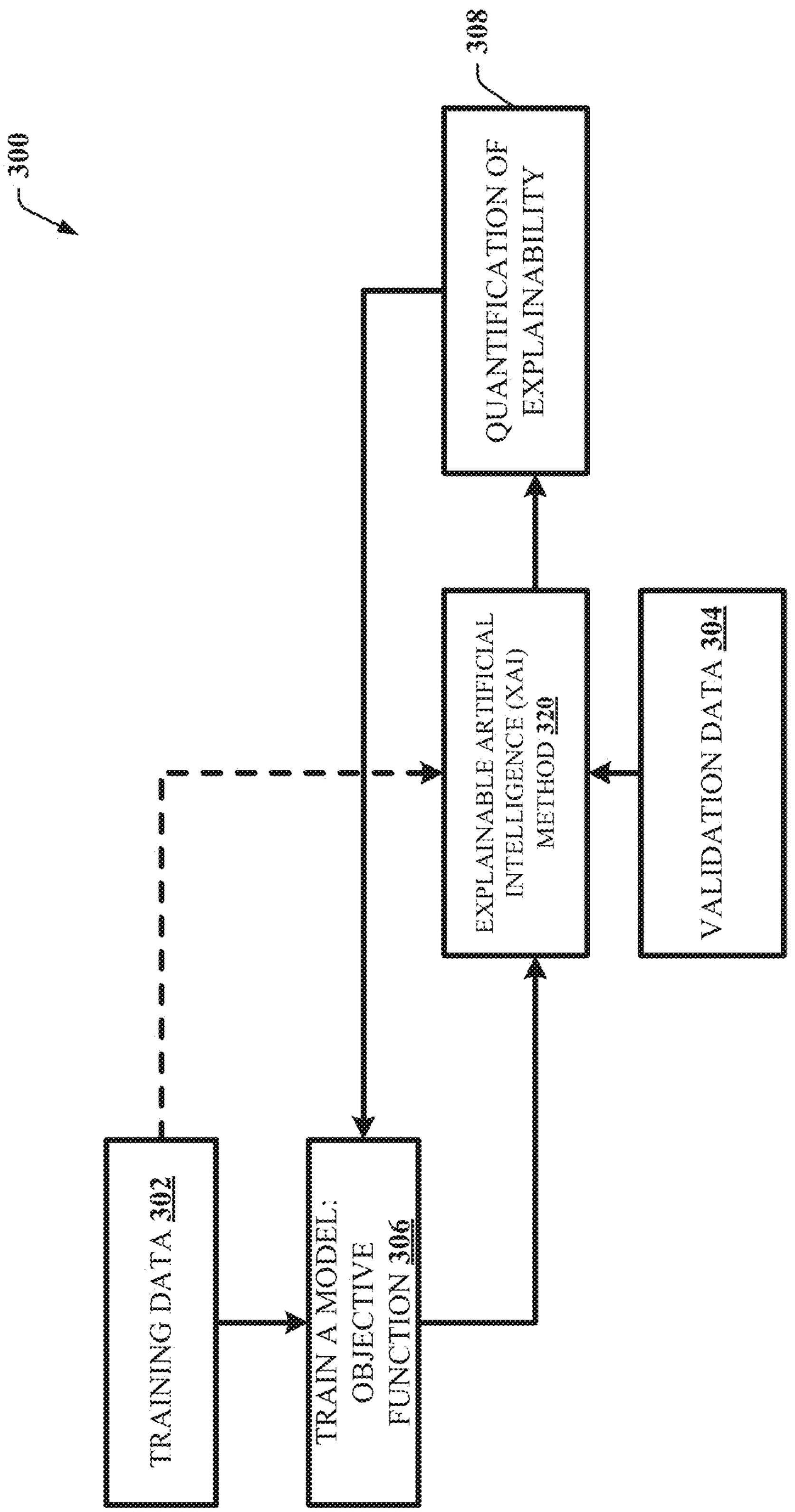
FIG. 3 illustrates a flow diagram of another example, non-limiting method that can train a machine learning model using an objective function modified to incorporate explainability constraints for the machine learning model in accordance with one or more embodiments described herein.

FIG. 3 illustrates a flow diagram of another example, non-limiting method 300 that can train a machine learning model using an objective function modified to incorporate explainability constraints for the machine learning model in accordance with one or more embodiments described herein. Non-limiting method 300 can be analogous to non-limiting method 100. Repetitive description of like elements and/or processes employed in respective embodiments is omitted for sake of brevity.

In an embodiment, incorporating explanation considerations and constraints into training of the machine learning model by using a modified objective function can be implemented by training the machine learning model on a training set, followed by quantification of the explainability of the machine learning model on a validation set, followed further by continuing training of the machine learning model on the training set based on the quantification of the explainability. That is, instead of the feature preferences being predefined, the feature preferences can be learned from an explanation quantification. For example, training data 302 can be used to train (e.g., by training component 114) a machine learning model (e.g., model 120 of FIG. 1) using objective function 306, wherein objective function 306 can be modified to incorporate an explainability term (e.g., as described in equation 1), however, during initialization, the feature preference vectors v in the explainability term can be initialized to zero (i.e., $v \in \mathbb{R}^m$ initialized to $v=[0]^m$).

The machine learning model (i.e., model trained using objective function 306) can be used in combination with validation data 304 (e.g., $(x_v, y_v)$) as input to an XAI method 320 (e.g., SHAP, LIME, etc.). For example, the machine learning model can be trained to identify animals based on properties of the animals. Thereafter, based on the trained model and validation data 304 comprising new instances of the animals (e.g., instances previously unseen by the trained model), XAI method 320 (e.g., using computation component 110 of FIG. 1) can generate an identification of the animals along with an explanation for the identification. At 308, the explainability of the trained model can be quantified. For example, computation component 110 (FIG. 1) can quantify explainability of the machine learning model based on objective function 306, training data 302 and validation data 304. The quantification can be user dependent and can have degrees of freedom. The quantification can be used to update the feature preference vector v in the explainability term of objective function 306. For example, update component 112 (FIG. 1) can iteratively update a feature preference vector corresponding to the explainability of the machine learning model based on computation component 110 quantifying the explainability of the machine learning model. Thereafter, subsequent iterations can be run wherein the machine learning model can be retrained with updated values of v.

In an embodiment, an output of the XAI method 320 (e.g., SHAP, LIME, etc.) can be a measure on only validation data 304 or the output can be a measure that can look for consistency or comparability between training data 302 (e.g., as indicated by the dashed arrow going into the XAI method 320 block) and validation data 304 on a property. At the level of validation data 304, an error type (e.g., error type 1 and error type 2) can be checked. For example, if error type 1 is minimized, it can imply that the machine learning model is explainable. Thus, a function can be built that can determine the feature preference vector based on validation data 304. At the level of training data 302 and validation data 304, using explanations for each of the instances in training data 302, it can be determined that globally, the explanations on training data 302 are very similar to the explanations on validation data 304, and if not, then the modifications to objective function 306 that can cause both the explanations to align can be determined.

Figure 4:
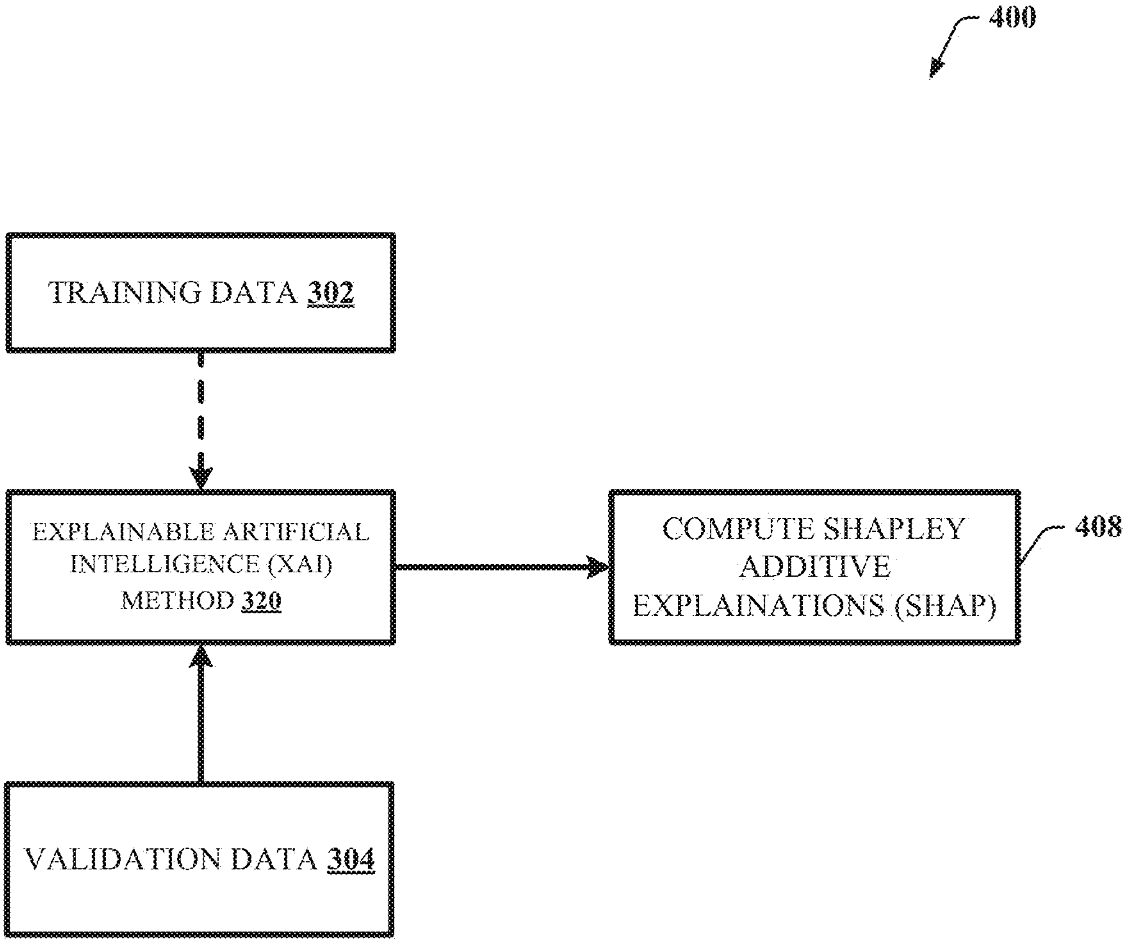
FIG. 4 illustrates a flow diagram of an example, non-limiting method that can quantify explainability for a machine learning model using training data and validation data of the machine learning model in accordance with one or more embodiments described herein.

FIG. 4 illustrates a flow diagram of an example, non-limiting method 400 that can quantify explainability for a machine learning model using training data and validation data of the machine learning model in accordance with one or more embodiments described herein. Non-limiting method 400 can be analogous to non-limiting method 300. Repetitive description of like elements and/or processes employed in respective embodiments is omitted for sake of brevity.

In an embodiment, incorporating explanation considerations and constraints into training of the machine learning model by using the modified objective function can be implemented by training the machine learning model on a training set, followed by quantification of the explainability of the machine learning model based on the training set and a validation set, followed by continuing training of the machine learning model on the training set based on the quantification of the explainability. As discussed with reference to FIG. 3, an output of the XAI method 320 can be a measure that can be used to look for consistency or comparability between training data 302 and validation data 304 on a property. For example, at 408, XAI method 320 can use training data 302 and validation data 304 of a machine learning model trained using objective function 306, to compute respective SHAP values for training data 302 and validation data 304. The SHAP values for training data 302 and validation data 304 can be compared (e.g., by computation component 110) to generate a quantification of explainability of the machine learning model. The quantification can be used to update the feature preference vector v in the explainability term of objective function 306 to improve a score representing how the explainability can be quantified. A different function can be used to decide how v can be updated to improve the score. For example, update component 112 (FIG. 1) can iteratively update a feature preference vector corresponding to the explainability of the machine learning model based on computation component 110 quantifying the explainability of the machine learning model.

Figure 5:
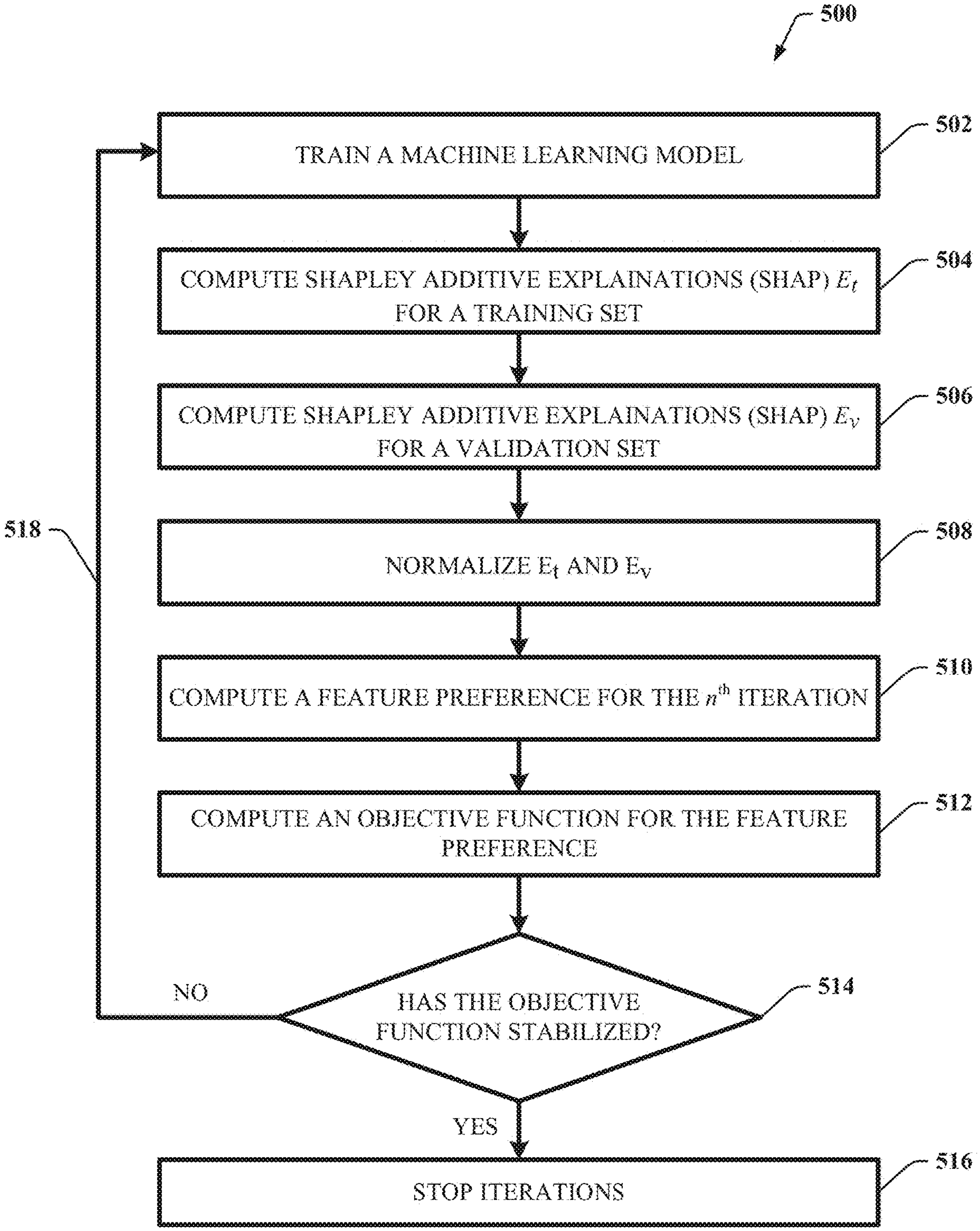
FIG. 5 illustrates a flow diagram of an example, non-limiting method that can be employed for convergence validation of an iterative process for incorporating explainability constraints in machine learning model training in accordance with one or more embodiments described herein.

FIG. 5 illustrates a flow diagram of an example, non-limiting method 500 that can be employed for convergence validation of an iterative process for incorporating explainability constraints in machine learning model training in accordance with one or more embodiments described herein. Non-limiting method 500 can be analogous to non-limiting method 300 and non-limiting method 400. Repetitive description of like elements and/or processes employed in respective embodiments is omitted for sake of brevity.

Non-limiting method 500 can be used to verify that the iterative process discussed with reference to at least FIG. 3 converges (i.e., proof of concept (POC)).

At 502 of non-limiting method 500, a machine learning model can be trained using an objective function (e.g., objective function 306) that can be modified to incorporate an explainability metric for the machine learning model.

At 504 of non-limiting method 500, computation component 110 can compute SHAP values $E_t$ for a training set. For example, with reference to FIGS. 3 and 4, an output of XAI method 320 can be the SHAP for training data 302.

At 506 of non-limiting method 500, computation component 110 can compute SHAP values $E_v$ for a training set. For example, with reference to FIGS. 3 and 4, an output of XAI method 320 can be the SHAP for training data 302 and validation data 304.

At 508 of non-limiting method 500, $E_t$ and $E_v$ can be normalized according to equations 6 and 7, respectively. For example, with reference to FIG. 3, $E_t$ and $E_v$ can be normalized as part of quantification of explainability at 308. The normalized $E_t$ and $E_v$ can be used to check how comparable respective explainabilities of the machine learning model are on the training set and the validation set.

$$E_t = \frac{|E_t|}{\text{sum}(|E_t|)} \quad \text{Equation 6}$$

$$E_v = \frac{|E_v|}{\text{sum}(|E_v|)} \quad \text{Equation 7}$$

At 510 of non-limiting method 500, computation component 110 can compute a feature preference for the $n^{th}$ iteration according to equation 8. For example, with reference to FIG. 3, computation component 110 can compute a feature preference for an iteration as part of quantification of explainability at 308. Based on the two normalized vectors (i.e., normalized $E_t$ and $E_v$), equation 8 can define the connection between the explainability of the machine learning model and projection of the explainability into a feature preference vector in an explainability term (e.g., explainability metric 116 of FIG. 1) to update the feature preference vector in the explainability term in the objective function.

$$F \cdot P_n = (1-\alpha) * F \cdot P_{n-1} + \alpha * (1 - (E_v - E_t)), \quad \text{Equation 8}$$

wherein $F \cdot P_n$ represents a feature preference vector (e.g., feature preference vector v described elsewhere herein) for an iteration ($n^{th}$ iteration), n represents a number of the iteration, and $1-(E_v-E_t)$ can represent the explainability based on the context. Further, alpha ($\alpha$) herein is a hyperparameter that represents relative importance of current explainability quantification (i.e., $1-(E_v-E_t)$) compared to a history of the feature preference vector (i.e., $F \cdot P_{n-1}$) in generating a new feature preference vector. For the feature preference equation to converge, a previous feature preference term and the feature preference term before the previous term can be considered.

At 512 of non-limiting method 500, the objective function can be computed based on the feature preference. For example, with reference to FIG. 3, objective function 306 can be computed during each iteration based on a feature preference vector computed for a previous iteration, as indicated by the solid arrow going into the objective function 306 block. At initialization, the feature preference vector in the explainability term of the objective function can be neutral and computing the objective function can comprise iteratively updating (e.g., update component 112 (FIG. 1)) the feature preference vector, such that the feature preference vector is not neutral during subsequent iterations. During each iteration, the method described with reference to FIG. 2 can be used for the optimization process described herein.

At 514 of non-limiting method 500, a determination can be made regarding whether the objective function has stabilized.

If yes, at 516 of non-limiting method 500, the iterations can stop. For example, a scenario wherein results of the objective function have not improved in more than three iterations can indicate that a greatest value for the objective function has been reached and the iterations can stop.

If no, at 518 of non-limiting method 500, the machine learning model can be retrained at 502 and the iterations can continue from step 502 through step 514.

Figure 6:
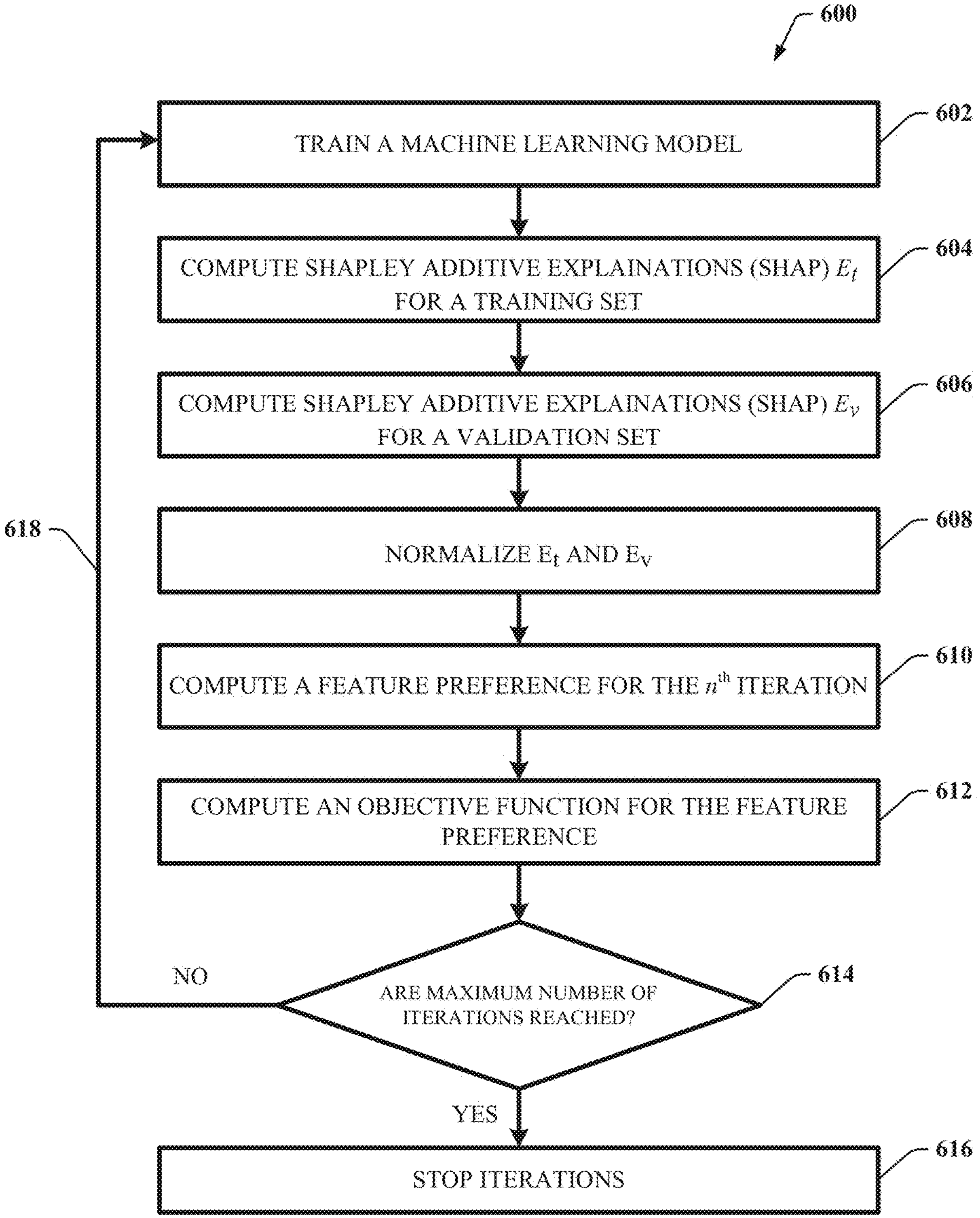
FIG. 6 illustrates a flow diagram of another example, non-limiting method that can be employed for convergence validation of an iterative process for incorporating explainability constraints in machine learning model training in accordance with one or more embodiments described herein.

FIG. 6 illustrates a flow diagram of another example, non-limiting method 500 that can be employed for convergence validation of an iterative process for incorporating explainability constraints in machine learning model training in accordance with one or more embodiments described herein. Non-limiting method 600 can be analogous to non-limiting method 300, non-limiting method 400 and non-limiting method 500. Repetitive description of like elements and/or processes employed in respective embodiments is omitted for sake of brevity.

At 602 of non-limiting method 600, a machine learning model can be trained using an objective function (e.g., objective function 306) that can be modified to incorporate an explainability metric for the machine learning model.

At 604 of non-limiting method 600, computation component 110 can compute SHAP values $E_t$ for a training set. For example, with reference to FIGS. 3 and 4, an output of XAI method 320 can be the SHAP for training data 302.

At 606 of non-limiting method 600, computation component 110 can compute SHAP values $E_v$ for a training set. For example, with reference to FIGS. 3 and 4, an output of XAI method 320 can be the SHAP for training data 302 and validation data 304.

At 608 of non-limiting method 600, $E_t$ and $E_v$ can be normalized according to equations 6 and 7, respectively. For example, with reference to FIG. 3, $E_t$ and $E_v$ can be normalized as part of quantification of explainability at 308. The normalized $E_t$ and $E_v$ can be used to check how comparable respective explainabilities of the machine learning model are on the training set and the validation set.

At 610 of non-limiting method 600, computation component 110 can compute a feature preference for the $n^{th}$ iteration according to equation 8. For example, with reference to FIG. 3, computation component 110 can compute a feature preference for an iteration as part of quantification of explainability at 308. Based on the two normalized vectors (i.e., normalized $E_t$ and $E_v$), equation 8 can define the connection between the explainability of the machine learning model and projection of the explainability into a feature preference vector in an explainability term (e.g., explainability metric 116 of FIG. 1) to update the feature preference vector in the explainability term in the objective function. For the feature preference equation to converge, a previous feature preference term and the feature preference term before the previous term can be considered.

At 612 of non-limiting method 600, the objective function can be computed for the feature preference. For example, with reference to FIG. 3, objective function 306 can be computed during each iteration based on a feature preference vector computed for a previous iteration, as indicated by the solid arrow going into the objective function 306 block. At initialization, the feature preference vector in the explainability term of the objective function can be neutral and computing the objective function can comprise iteratively updating (e.g., update component 112 (FIG. 1)) the feature preference vector, such that the feature preference vector is not neutral during subsequent iterations. During each iteration, the method described with reference to FIG. 2 can be used for the optimization process described herein.

At 614 of non-limiting method 600, a determination can be made regarding whether a maximum number of iterations have been reached.

If yes, at 616 of non-limiting method 600, the iterations can stop. For example, when maximum number of iterations are reached, the iterations can stop. The maximum number of iterations can be provided as a hyperparameter that can be user-defined.

If no, at 618 of non-limiting method 600, the machine learning model can be retrained at 602 and the iterations can continue from step 602 through step 614.

Figure 7A:
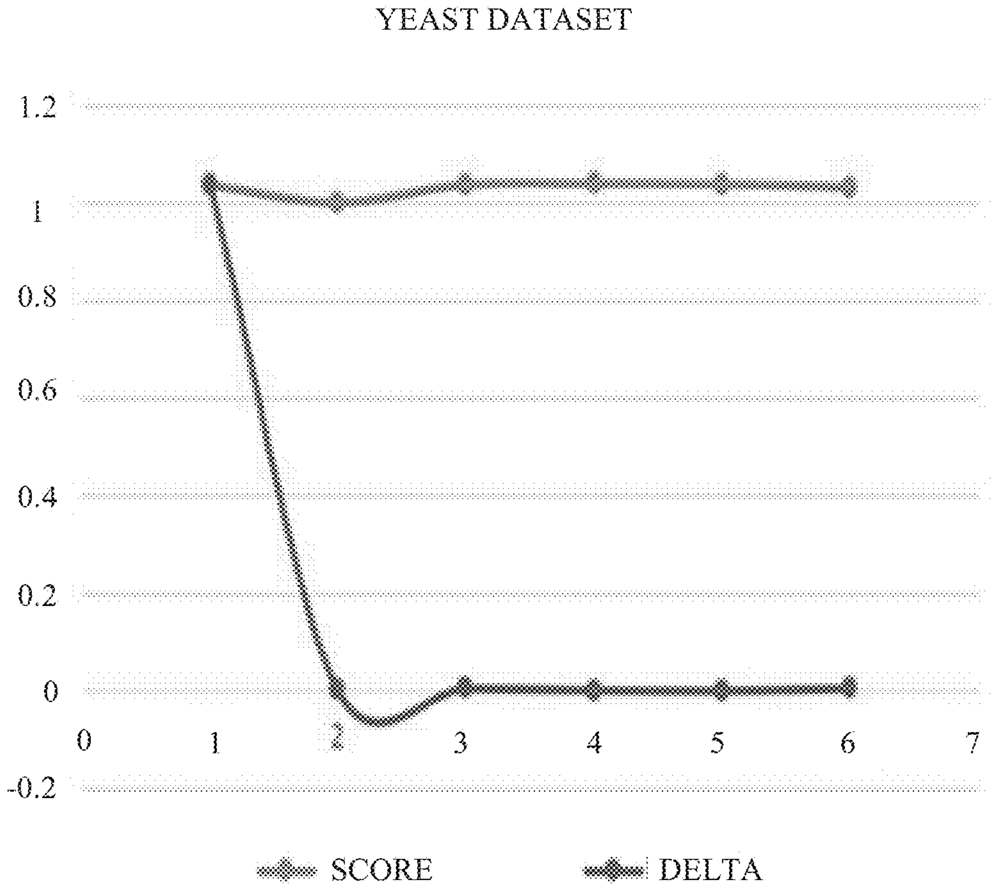
FIG. 7A illustrates an example, non-limiting graph based on experimental evaluations in accordance with one or more embodiments described herein.

FIG. 7A illustrates an example, non-limiting graph 700 based on experimental evaluations in accordance with one or more embodiments described herein. Repetitive description of like elements and/or processes employed in respective embodiments is omitted for sake of brevity.

Graph 700 results from experimental evaluations on a yeast dataset for convergence validation of an iterative process (e.g., as described with reference to at least FIG. 5) for incorporating explainability constraints into machine learning model training. In graph 700, the blue line can indicate that a delta (change in an objective function value in an iteration compared to a previous iteration) does not start at zero (the score does get slightly updated), but after some iterations the objective function can get stabilized. For example, the blue line (delta), as illustrated in graph 700, is fairly flat (very close to zero), which can indicate that the objective function value can remain relatively unchanged over k iterations, wherein k can be the number of iterations, and wherein k was set to 3 for the experimental evaluations.

Figure 7B:
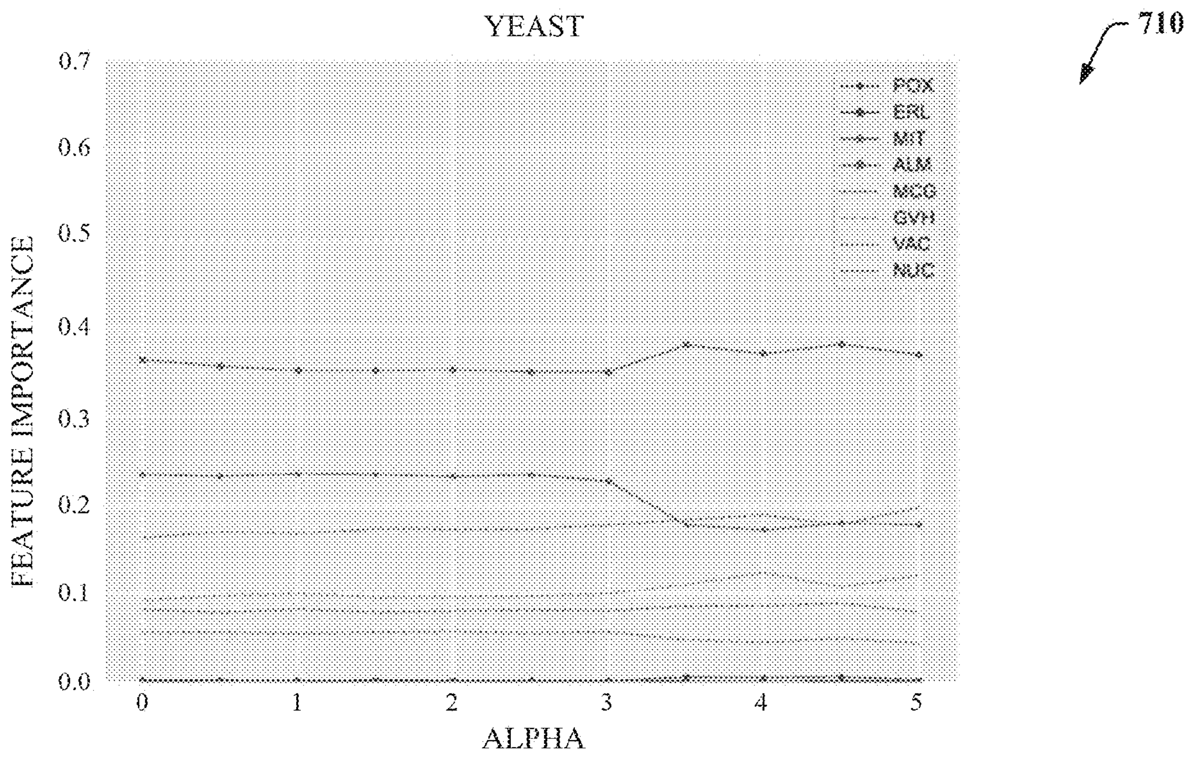
FIG. 7B illustrates example, non-limiting graphs showing the effects of a hyperparameter controlling a similarity metric weight during an optimization process based on Yeast and Adult Income datasets in accordance with one or more embodiments described herein.
Figure 7B:
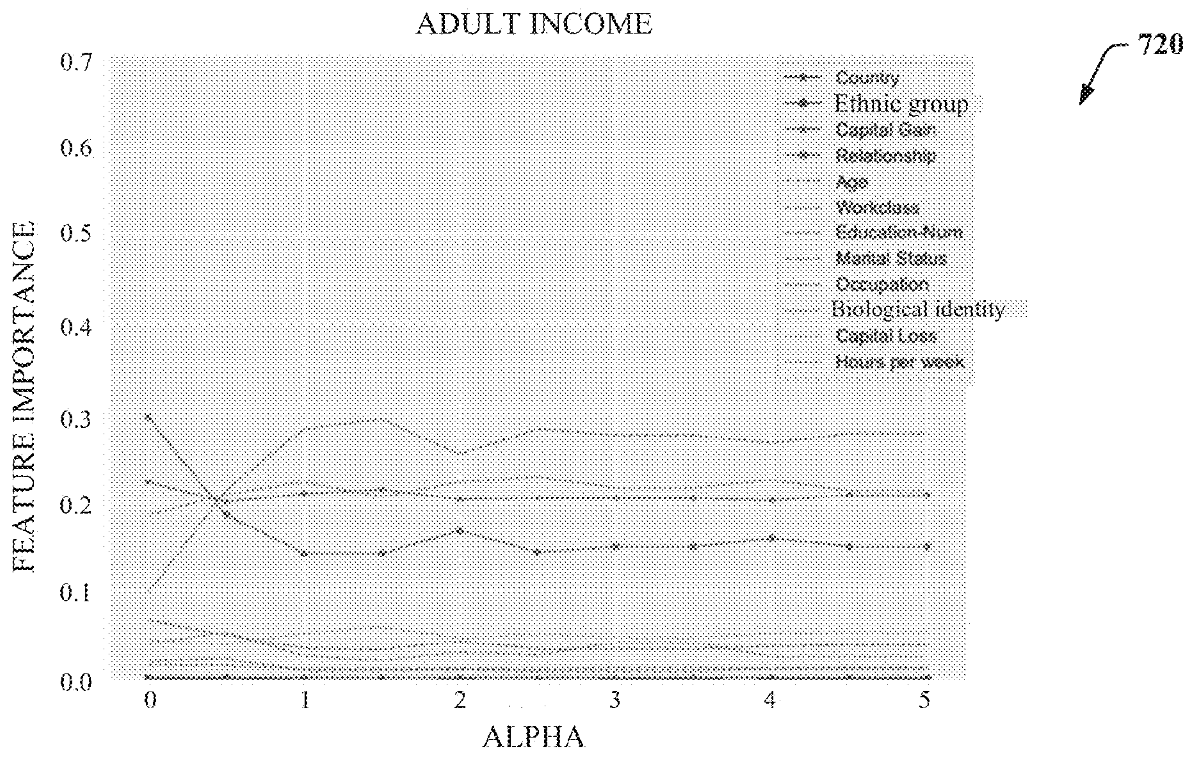
Figure 7C:
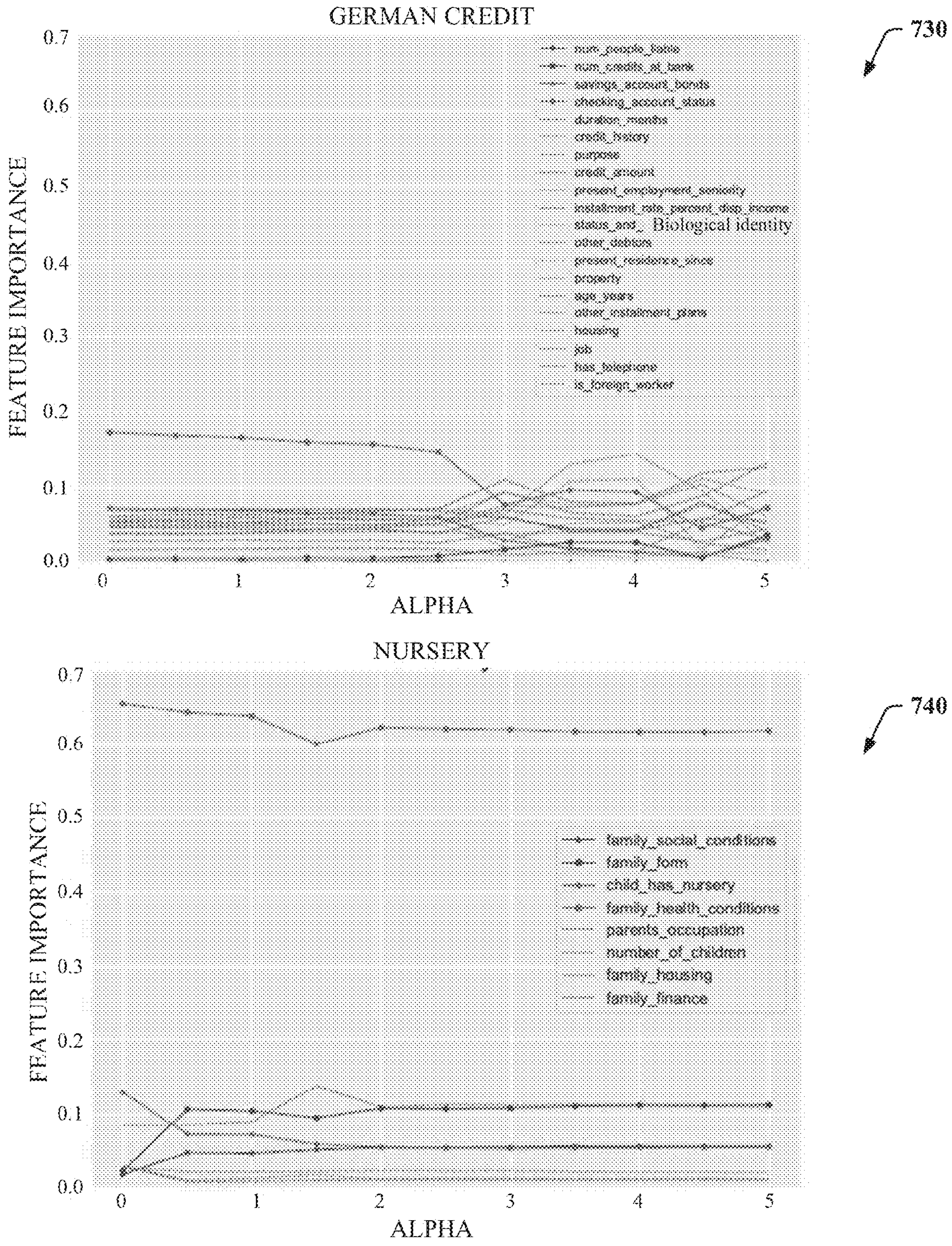
FIG. 7C illustrates example, non-limiting graphs showing the effects of a hyperparameter controlling a similarity metric weight during an optimization process based on German Credit and Nursery datasets in accordance with one or more embodiments described herein.
Figure 7D:
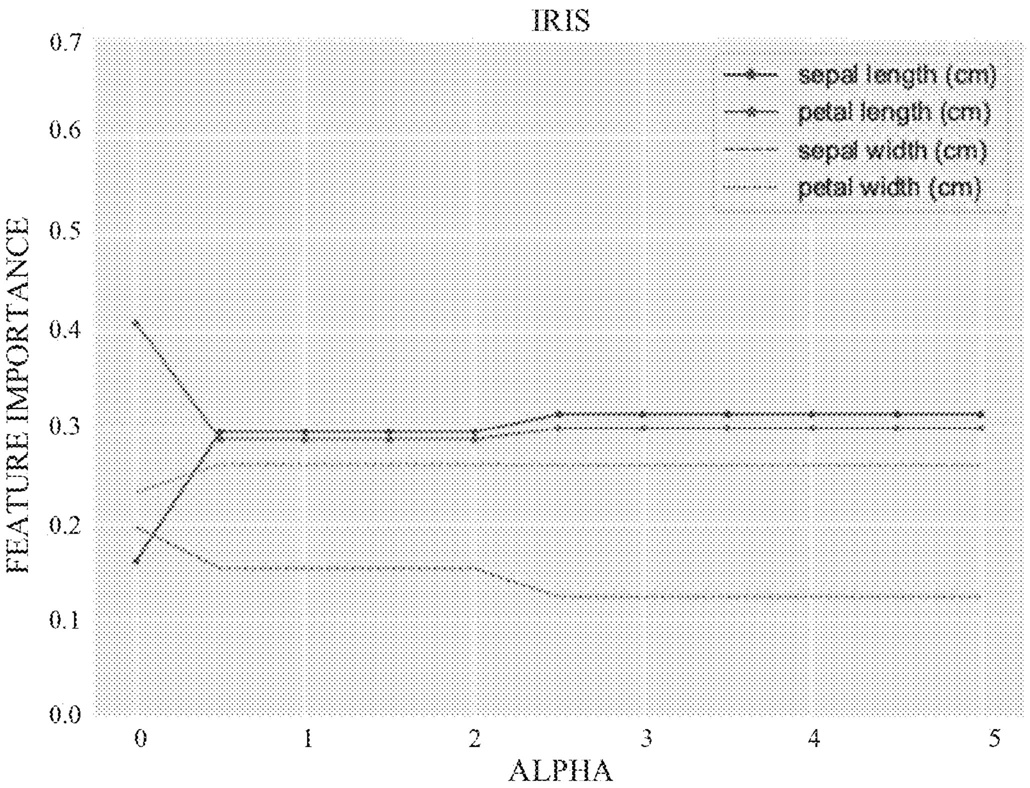
FIG. 7D illustrates example, non-limiting graphs showing the effects of a hyperparameter controlling a similarity metric weight during an optimization process based on Iris and Cancer datasets in accordance with one or more embodiments described herein.
Figure 7D:
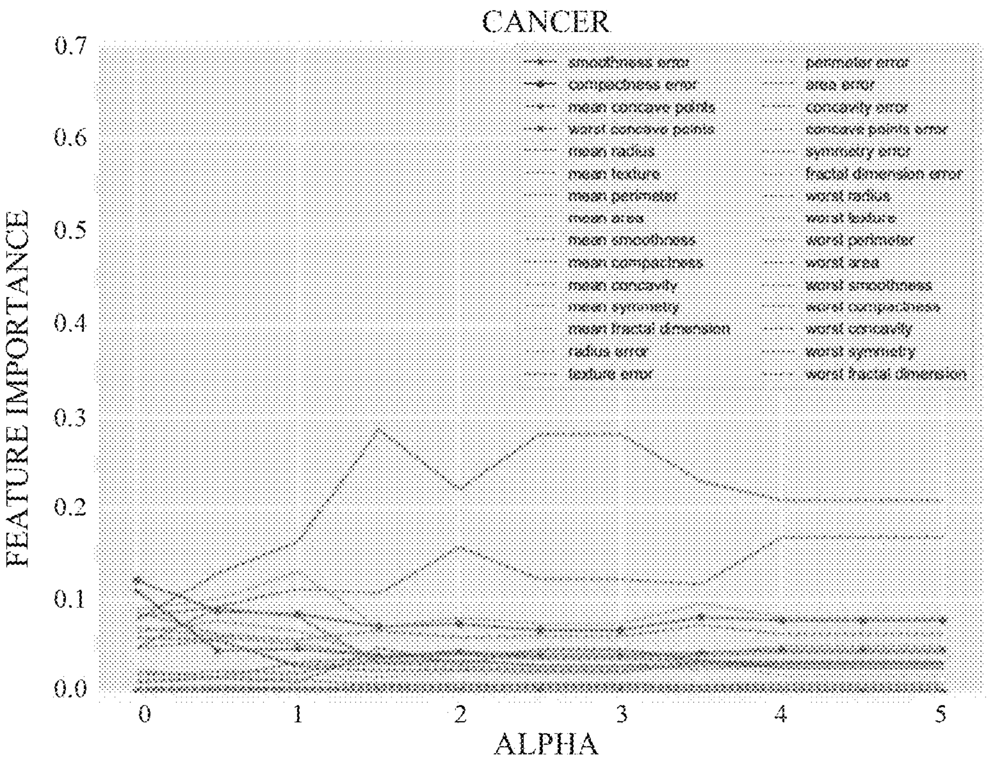

FIGS. 7B-7D illustrate example, non-limiting graphs 710, 720, 730, 740, 750 and 760 showing the effects of a hyperparameter controlling a similarity metric weight during an optimization process based respectively on Yeast, Adult Income, German Credit, Nursery, Iris and Cancer (i.e., for a type of cancer commonly occurring in females) datasets in accordance with one or more embodiments described herein. Repetitive description of like elements and/or processes employed in respective embodiments is omitted for sake of brevity.

An experimental evaluation process for the one or more embodiments discussed herein consisted of comparing XRF performances for different a values, with RF as a baseline. It is to be appreciated that the evaluations described with reference to FIGS. 7B-7D relate to the methods disclosed with respect to FIG. 2 and corresponding to defining feature preferences globally in a dataset. The evaluation was performed on six benchmark datasets comprising Yeast, Adult Income, German Credit, Nursery, Iris and Cancer datasets (as listed in table 1). As stated earlier, the cancer dataset corresponds to a type of cancer commonly found in females. Due to scarcity of some of the labels in the German credit and Nursery datasets, only the top four and top three labels, respectively, were used from the two datasets. That is, for the German credit dataset only the CYT, NUC, MIT, and ME3 labels were used, and for the Nursery dataset only the not_recom, priority, and spec_prior labels were used.

TABLE 1

Description of the datasets used in the XRF evaluation. Due to scarcity of some of the labels, only the most common labels for the German Credit and the Nursery datasets were used.

| Dataset | #Samples | #Features | #Labels |
|---|---|---|---|
| Yeast | 1,229 | 8 | 4* |
| Adult Income | 32,561 | 12 | 2 |
| German Credit | 1,000 | 20 | 2 |
| Nursery | 12,960 | 8 | 3* |
| Iris | 150 | 4 | 3 |
| Cancer | 569 | 30 | 2 |

Since the XRF can rely on an entity (e.g., a hardware, software, machine, AI, human user, etc.) to specify an FP vector, an automated testing procedure was developed to challenge an ability of the XRF to affect FI values. Inverting the FI values of a trained model can be a complicated task, since a signal supporting the model prediction can be embedded within the features with the greatest FI values. Thus, to test the effect of an objective function of the XRF, a testing scheme was employed, wherein an RF model was trained on a dataset $\mathcal{D}$, FI values of features of the dataset $\mathcal{D}$ for the RF model were extracted, and the FP vector was set such that top-importance and bottom-importance features (one if $|\mathcal{D}|\leq 5$ and two if $|\mathcal{D}|>5$, $|\mathcal{D}|$ being an amount of features in $\mathcal{D}$) can be penalized and rewarded, respectively. The remaining features were assigned neutral preference. For example, dataset $\mathcal{D}$ can be comprise four features ($|\mathcal{D}|=4$). Then for an RF model on $\mathcal{D}$ with FI values of [0.15, 0.3, 0.2, 0.35], the first and last features can be the least (0.15) and most (0.35) important features in the RF, respectively. Thus, for an optimization process of the XRF, the FP vector can be set to: [1, 0, 0, −1].

In the experiments, a grid search over hyperparameters of the RF and the GA was performed. For each dataset, the grid search was performed once (with random seed=42). Table 2 summarizes the results of the grid searches per dataset. The hyperparameters were used to evaluate three XRF models for three different values of a, the hyperparameter controlling a weight of an XS (i.e., eXplainability score) in the objective function of the XRF. To measure the prediction performance of the model the F1 score and accuracy metrics were used, whereas to measure the adherence to the FP vector, the XS was used (it is to be noted that for cosine similarity, $-1\leq XS\leq 1$). The experiments were run ten times per dataset, using a different random seed in individual runs.

TABLE 2

Values of hyperparameters per dataset based on grid searches (random seed = 42). The number of decision trees (#Trees), max depth, and max samples (per tree) were searched on RFs. Their results were set and the number of generations (#Gens), mating probability (prob.) and mutation probability (prob.) were then searched on XRF with $\alpha$ = 0.0.

| Dataset | #Trees | Max Depth | Max Samples | #Gens. | Mating Prob. | Mutation Prob. |
|---|---|---|---|---|---|---|
| Yeast | 40 | 5 | 0.4 | 20 | 0.5 | 0.7 |
| Adult Income | 70 | 6 | 0.6 | 30 | 0.5 | 0.7 |
| German Credit | 70 | 6 | 0.8 | 120 | 0.5 | 0.4 |
| Nursery | 30 | 6 | 0.8 | 100 | 0.5 | 0.7 |
| Iris | 10 | 2 | 0.2 | 10 | 0.1 | 0.1 |
| Cancer | 40 | 3 | 0.6 | 20 | 0.5 | 0.4 |

Results

Since the XRF optimization process can balance between the task performance (e.g., F1 score) and the XS, the experiments started by testing how the balance can affect the XRF model. Three metrics (i.e., accuracy, F1 score and XS) for the resulting XRF model were computed. The evaluation was performed on six benchmark datasets (as listed in table 1) for three different a values (0.5, 1.0, and 2.0; table 3).

The classification performance metrics (i.e., accuracy and F1) were compared to a baseline model, wherein the baseline model comprised an RF classifier trained using comparable configuration (e.g., number of trees, max depth, and max samples) to the respective XRF model (see RF column in Table 3). The results demonstrate that for most of the datasets the classification performance metrics decreased gradually compared to the respective baselines models as a was increased. Conversely, as desired, for most of the datasets XS gradually increased as a was increased. For some datasets (e.g., Nursery) an increase in the performance metrics of the XRF model with $\alpha$=0.5 was observed, as compared to the baseline RF model. This can be attributed to the optimization step in XRF, which can search for weights to be assigned to the decision trees in the ensemble such that the objective function (equation 3) can be maximal. For $\alpha$ values smaller than 1, the objective function can assign greater importance to the performance term than to the XS term.

To further evaluate the effects of the objective function on the FI values, FI value of each feature was plotted, per dataset, as a function of a (FIGS. 7B-7C). Solid blue and magenta lines in the plots indicate features that were rewarded and penalized, respectively, according to the FP vectors. Dotted lines indicate neutral features. Individual features are identified by respective legends for the graphs. In some datasets (e.g., Iris and Nursery) a clear exchange was observed in the FI values between penalized and rewarded features, whereas in other datasets (e.g., Adult Income) a clear exchange was observed between penalized and neutral features. Finally, it was also observed in some datasets (e.g., Adult Income and Yeast) that the FI values of rewarded features remained fairly unchanged, suggesting that the model did not find the features sufficiently useful. Overall, the results can lend support to the hypothesis that the optimization process of the XRF can shift rewarded and penalized FI values in an intended direction when possible, but does not impose the feature preference at any cost.

TABLE 3

Performance comparison of models per dataset. All values in table 3 are presented in Mean ± SD form based on ten runs, each with a different random seed. In table 3, Acc. represents accuracy, SD represents standard deviation, XRFk represents explainable Random Forest with α = k and NA stands for not applicable.

| Dataset | Metric | RF | $XRF_{0.5}$ | $XRF_{1.0}$ | $XRF_{2.0}$ |
|---|---|---|---|---|---|
| Yeast | Acc. | 0.6046 ± 0.0161 | 0.6050 ± 0.0156 | 0.5992 ± 0.0167 | 0.5950 ± 0.0265 |
| | $F_1$ | 0.6310 ± 0.0165 | 0.6297 ± 0.0152 | 0.6239 ± 0.0179 | 0.6190 ± 0.0310 |
| | XS | NA | 0.2012 ± 0.0077 | 0.2098 ± 0.0143 | 0.2262 ± 0.0210 |
| Adult | Acc. | 0.8553 ± 0.0026 | 0.8492 ± 0.0045 | 0.8497 ± 0.0043 | 0.8496 ± 0.0039 |
| Income | $F_1$ | 0.7752 ± 0.0049 | 0.7670 ± 0.0079 | 0.7670 ± 0.0072 | 0.7662 ± 0.0063 |
| | XS | NA | 0.3452 ± 0.0475 | 0.3540 ± 0.0438 | 0.3431 ± 0.0446 |
| German | Acc. | 0.7460 ± 0.0198 | 0.7465 ± 0.0182 | 0.7415 ± 0.0201 | 0.7315 ± 0.0242 |
| Credit | $F_1$ | 0.5983 ± 0.0362 | 0.6009 ± 0.0354 | 0.5981 ± 0.0354 | 0.5862 ± 0.0347 |
| | XS | NA | 0.2800 ± 0.0100 | 0.2852 ± 0.0158 | 0.3198 ± 0.0406 |
| Nursery | Acc. | 0.9313 ± 0.0050 | 0.9356 ± 0.0041 | 0.9324 ± 0.0069 | 0.9151 ± 0.0129 |
| | $F_1$ | 0.9303 ± 0.0050 | 0.9348 ± 0.0041 | 0.9315 ± 0.0070 | 0.9141 ± 0.0129 |
| | XS | NA | 0.2583 ± 0.0239 | 0.2728 ± 0.0203 | 0.2895 ± 0.0199 |
| Iris | Acc. | 0.9600 ± 0.0200 | 0.9533 ± 0.0400 | 0.9567 ± 0.0367 | 0.9567 ± 0.0367 |
| | $F_1$ | 0.9599 ± 0.0201 | 0.9528 ± 0.0406 | 0.9564 ± 0.0371 | 0.9564 ± 0.0371 |
| | XS | NA | 0.3348 ± 0.0760 | 0.3538 ± 0.0780 | 0.3573 ± 0.0768 |
| Cancer | Acc. | 0.9553 ± 0.0177 | 0.9518 ± 0.0181 | 0.9544 ± 0.0195 | 0.9561 ± 0.0239 |
| | $F_1$ | 0.9518 ± 0.0191 | 0.9480 ± 0.0194 | 0.9507 ± 0.0212 | 0.9525 ± 0.0257 |
| | XS | NA | 0.3683 ± 0.0357 | 0.3761 ± 0.0258 | 0.3802 ± 0.0275 |

The results of the experimental evaluations discussed herein are reported for a particular choice of XS (cosine similarity) and normalization strategy (softmax). However, the proposed XRF model does not limit a user or entity (e.g., hardware, software, machine, AI, human user, etc.) to this configuration and the user or entity can choose to use other similarity metrics for XS and other normalization strategies for weights of the decision trees. Herein, XRF models can be considered with alternative configurations.

During the course of the evaluations, defining the input FP vector as a probability distribution (FPi∈[0, 1] and $$\sum_{i=1}^{N} FP_i = 1)$$

was considered. Under this definition, the model's usage of features with high or low probabilities in the FP vector can be encouraged or discouraged, respectively, by the optimization process. Cross-Entropy (CE) is a well-defined distance metric between two probability distributions as described by equation 9.

$$CE(P, Q) = -\sum_{i=1}^{m} P_i \cdot \log Q_i, \qquad \text{Equation 9}$$

wherein Q and P represent two probability distributions over the same m variables in a corresponding order. Thus, a CE-based similarity measure can be used for XS. Given the FP vector and the FI values, which can satisfy conditions for probability distributions, the following similarity measure can be defined.

$$XS(FI, FP) = \frac{1}{CE(FP, FI) + 1} \qquad \text{Equation 10}$$

For the weights normalization strategy an alternative of absolute value normalization was considered as described by equation 11.

$$\hat{w}_i = \frac{|w_i|}{\sum_{j=1}^{k} |w_i|}, \qquad \text{Equation 11}$$

wherein $w_i$ for 1≤i≤k∈ ℕ is the weight of the $i^{th}$ decision tree in the XRF model.

The modified Yeast dataset (i.e., with four labels after removing relatively scarce labels) was used and a grid search was performed over the hyperparameters for each of the combinations of normalization strategy and XS. Since the performance of RF can remain unaffected by these choices, there was no need to repeat the grid search for parameters that were determined based on RF (i.e., number of trees, max depth, and max samples). A grid search was performed over the hyperparameters related to the optimization process, using XRF with α=0. The results of the grid search were identical to the results using the cosine similarity measure and softmax normalization strategy (top row in Table 2). The performance of three XRF models was evaluated with αε[0.5, 1.0, 2.0], similar to the main experimental setting (table 4). Similar to the main experimental setting, the evaluations herein were based on ten runs, using a different random seed in each run. Overall, the results can suggest that the configuration chosen in the main experimental setting (i.e., cosine similarity for XS and the softmax normalization strategy) can either be comparable to or better than the considered alternatives, according to the metrics discussed herein.

TABLE 4

Performance comparison of XRFs with different configurations for the modified Yeast dataset. Results are presented in Mean ± SD form based on ten runs, each with a different random seed. In table 4, Abs. stands for absolute, CS represents cosine similarity, CE represents cross-entropy, SM represents Softmax, Acc. Represents accuracy, SD represents standard deviation and XRFk represents explainable Random Forest with $\alpha = k$.

| Config. | Metric | $XRF_{0.5}$ | $XRF_{1.0}$ | $XRF_{2.0}$ |
|---|---|---|---|---|
| Abs. + | Acc. | 0.6046 ± 0.0206 | 0.6015 ± 0.0180 | 0.5942 ± 0.0189 |
| CS | $F_1$ | 0.6310 ± 0.0221 | 0.6273 ± 0.0205 | 0.6171 ± 0.0225 |
| | XS | 0.2062 ± 0.0095 | 0.2139 ± 0.0114 | 0.2230 ± 0.0135 |
| Abs. + | Acc. | 0.6062 ± 0.0137 | 0.6092 ± 0.0122 | 0.6042 ± 0.0177 |
| CE | $F_1$ | 0.6319 ± 0.0152 | 0.6351 ± 0.0118 | 0.6311 ± 0.0188 |
| | XS | 0.1405 ± 0.0056 | 0.1431 ± 0.0062 | 0.1472 ± 0.0058 |
| SM + | Acc. | 0.6050 ± 0.0156 | 0.5992 ± 0.0167 | 0.5950 ± 0.0265 |
| CS | $F_1$ | 0.6297 ± 0.0152 | 0.6239 ± 0.0179 | 0.6190 ± 0.0310 |
| | XS | 0.2012 ± 0.0077 | 0.2098 ± 0.0143 | 0.2262 ± 0.0210 |
| SM + | Acc. | 0.6042 ± 0.0121 | 0.6038 ± 0.0118 | 0.6035 ± 0.0164 |
| CE | $F_1$ | 0.6314 ± 0.0142 | 0.6282 ± 0.0114 | 0.6286 ± 0.0173 |
| | XS | 0.1403 ± 0.0054 | 0.1430 ± 0.0063 | 0.1468 ± 0.0065 |

Figure 7E:
FIG. 7E illustrates an example, non-limiting graph showing an effect of increasing an amount of decision trees in an XRF ensemble on an explainability score in accordance with one or more embodiments described herein.

FIG. 7E illustrates an example, non-limiting graph 770 showing an effect of increasing an amount of decision trees in an XRF ensemble on an explainability score in accordance with one or more embodiments described herein. Repetitive description of like elements and/or processes employed in respective embodiments is omitted for sake of brevity.

Another hyperparameter of the XRF model that can considerably affect the performance of the model can be an amount (e.g., the number) of decision trees in the ensemble. In the main experimental setting (e.g., FIGS. 7B-7D), the amount of decision trees were selected based on a grid search on RF. That is, the amount of decision trees was determined based on performance only and without optimization. For creating a robust method, how the amount of decision trees in the XRF ensemble can affect the XS was examined. To that end, multiple XRF models were trained on the modified Yeast dataset (same variation as above), each with a different amount of decision trees. The experiment was repeated with eleven (11) $\alpha$ values for every number of decision trees (e.g., FIG. 7E). The results did not reveal a clear trend in XS when plotted against the number of decision trees, thereby suggesting that the XS can be relatively unaffected by the number of decision trees in the XRF. Thus, it can be concluded that the number of decision trees in the XRF can be a hyperparameter that can be left to the user or an entity (e.g., hardware, software, machine, AI, human entity, etc.) to set, either manually or by using an automatic grid search.

The results of our experiments demonstrate that the FI values in the XRF model can be affected as expected by the FP vector, and in a controlled manner. For example, the feature importance of a rewarded feature can be increased only if either the feature can provide information that could be used for prediction by the model or explainability can be highly prioritized over performance ($1 \ll \alpha$). Similarly, the feature importance of a penalized feature can be decreased only if either the predictive signal provided to the model by the penalized feature can be replaced by another feature or features, or explainability can be highly prioritized over performance ($1 \ll \alpha$). The hypothesis that the XRF success in affecting the FI values can be attributed to the number of decision trees in the ensemble (with more trees, weights can be assigned more finely) was also tested. However, the results suggest that the XS of the XRF model can be relatively unaffected by the number of decision trees in the model. The one or more embodiments herein can lead to future research comprising extending models that can be more complex than RF, developing other forms of human-defined or metric-derived explainability, and developing other explainability quantification metrics. One or more embodiments herein, can serve as building blocks towards the development of more machine learning models that can balance the tradeoff between performance and explainability during training in an informed manner.

Figure 8:
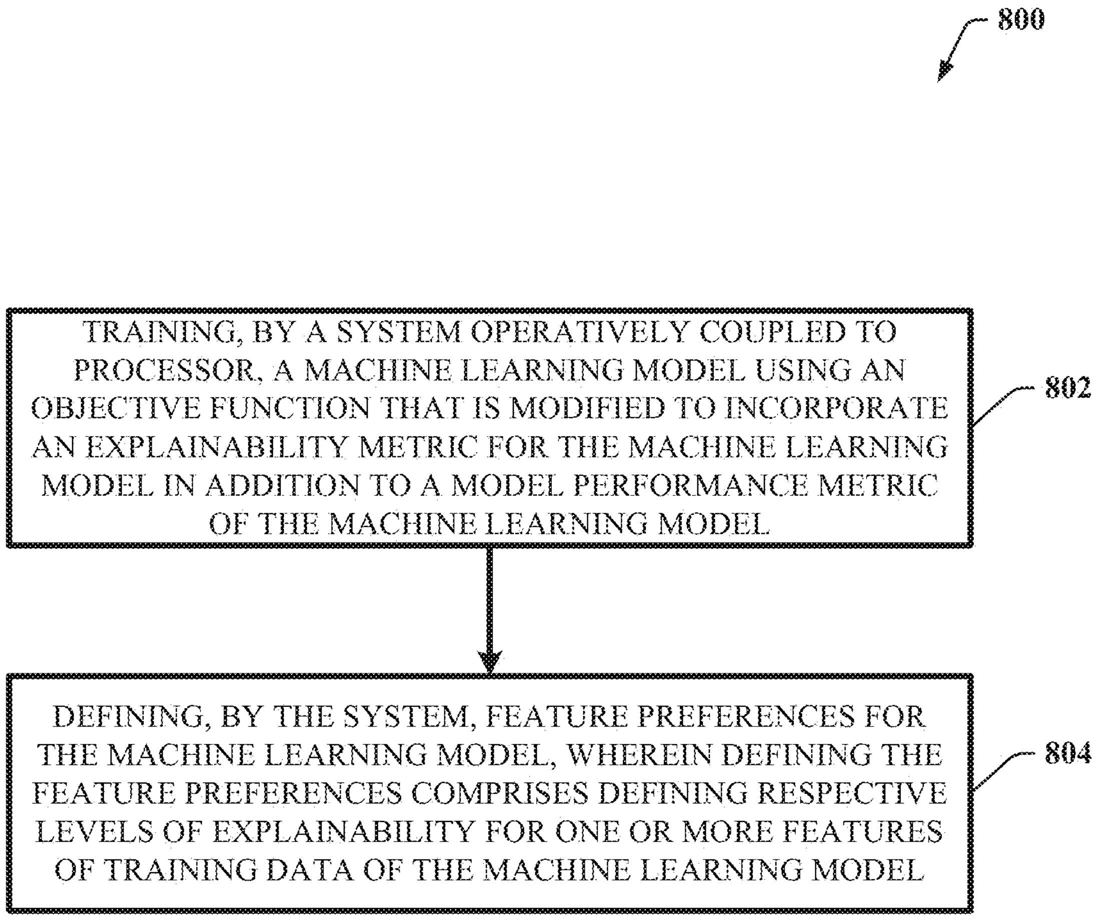
FIG. 8 illustrates a flow diagram of an example, non-limiting method for incorporating explainability constraints into machine learning model training using a modified objective function in accordance with one or more embodiments described herein.

FIG. 8 illustrates a flow diagram of an example, non-limiting method 800 for incorporating explainability constraints into machine learning model training using a modified objective function in accordance with one or more embodiments described herein. Repetitive description of like elements and/or processes employed in respective embodiments is omitted for sake of brevity.

At 802, the non-limiting method 800 can comprise training (e.g., by training component 114), by a system operatively coupled to processor, a machine learning model using an objective function that can be modified to incorporate an explainability metric for the machine learning model in addition to a model performance metric of the machine learning model.

At 804, the non-limiting method 800 can comprise defining (e.g., by definition component 108), by the system, feature preferences for the machine learning model, wherein defining the feature preferences can comprise defining respective levels of explainability for one or more features of training data of the machine learning model.

Figure 9:
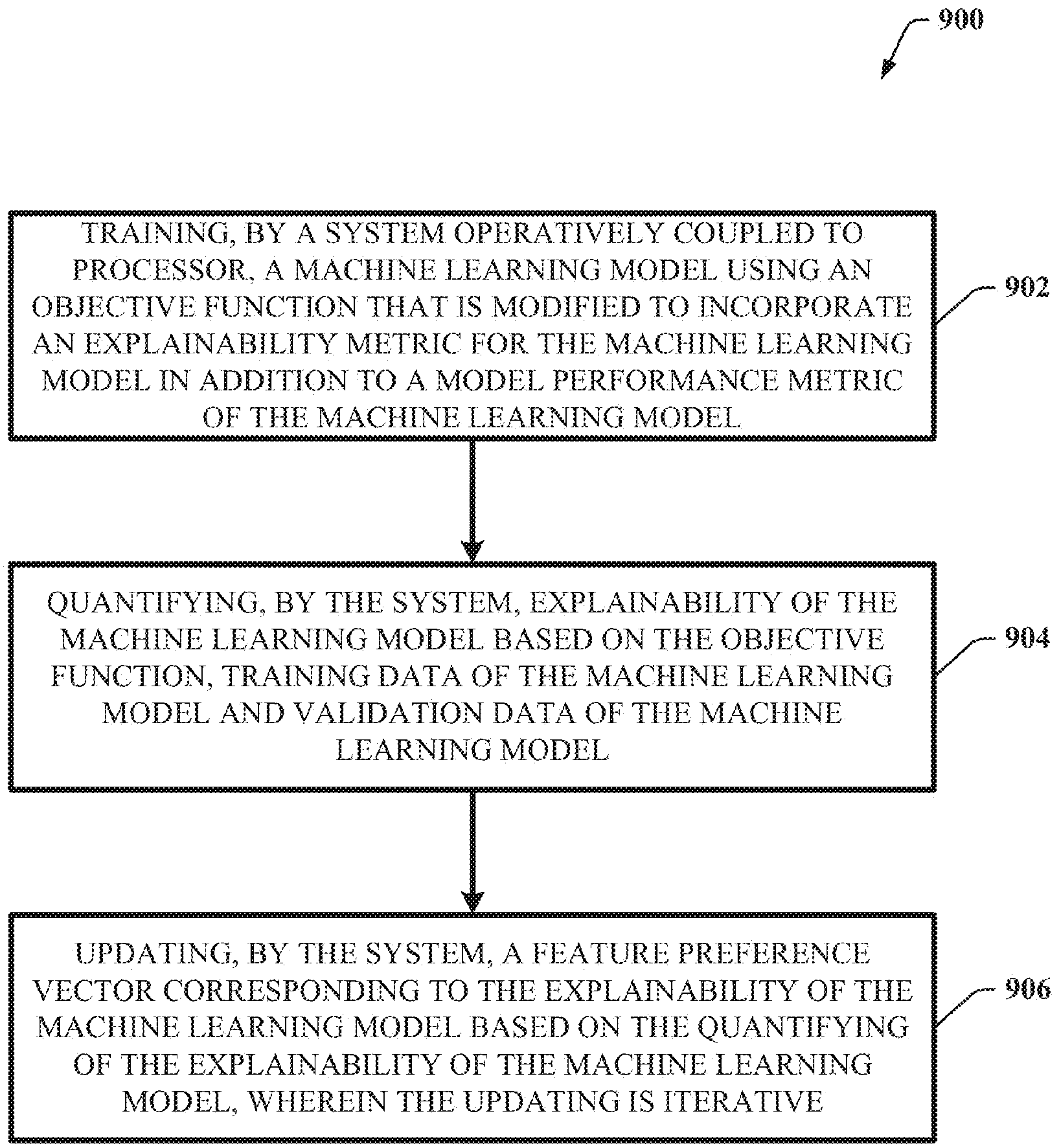
FIG. 9 illustrates a flow diagram of another example, non-limiting method for incorporating explainability constraints into machine learning model training using a modified objective function in accordance with one or more embodiments described herein.

FIG. 9 illustrates a flow diagram of another example, non-limiting method 900 for incorporating explainability constraints into machine learning model training using a modified objective function in accordance with one or more embodiments described herein. Repetitive description of like elements and/or processes employed in respective embodiments is omitted for sake of brevity.

At 902, the non-limiting method 900 can comprise training (e.g., by training component 114), by a system operatively coupled to processor, a machine learning model using an objective function that can be modified to incorporate an explainability metric for the machine learning model in addition to a model performance metric of the machine learning model.

At 904, the non-limiting method 900 can comprise quantifying (e.g., by computation component 110), by the system, explainability of the machine learning model based on the objective function, training data of the machine learning model and validation data of the machine learning model.

At 906, the non-limiting method 900 can comprise updating (e.g., by update component 112), by the system, a feature preference vector corresponding to the explainability of the machine learning model based on the quantifying of the explainability of the machine learning model, wherein the updating can be iterative.

For simplicity of explanation, the computer-implemented and non-computer-implemented methodologies provided herein are depicted and/or described as a series of acts. It is to be understood that the subject innovation is not limited by the acts illustrated and/or by the order of acts, for example acts can occur in one or more orders and/or concurrently, and with other acts not presented and described herein. Furthermore, not all illustrated acts can be utilized to implement the computer-implemented and non-computer-implemented methodologies in accordance with the described subject matter. Additionally, the computer-implemented methodologies described hereinafter and throughout this specification are capable of being stored on an article of manufacture to enable transporting and transferring the computer-implemented methodologies to computers. The term article of manufacture, as used herein, is intended to encompass a computer program accessible from any computer-readable device or storage media.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

One or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively train a machine learning model using a modified objective function to incorporate an explainability metric of the machine learning model, quantify explainability of the machine learning model, iteratively train the machine learning model using the quantified explainability, etc. as the one or more embodiments described herein can enable this process. And, neither can the human mind nor a human with pen and paper train a machine learning model to balance a tradeoff between explainability and performance of the machine learning model while making predictions, as conducted by one or more embodiments described herein.

Figure 10:
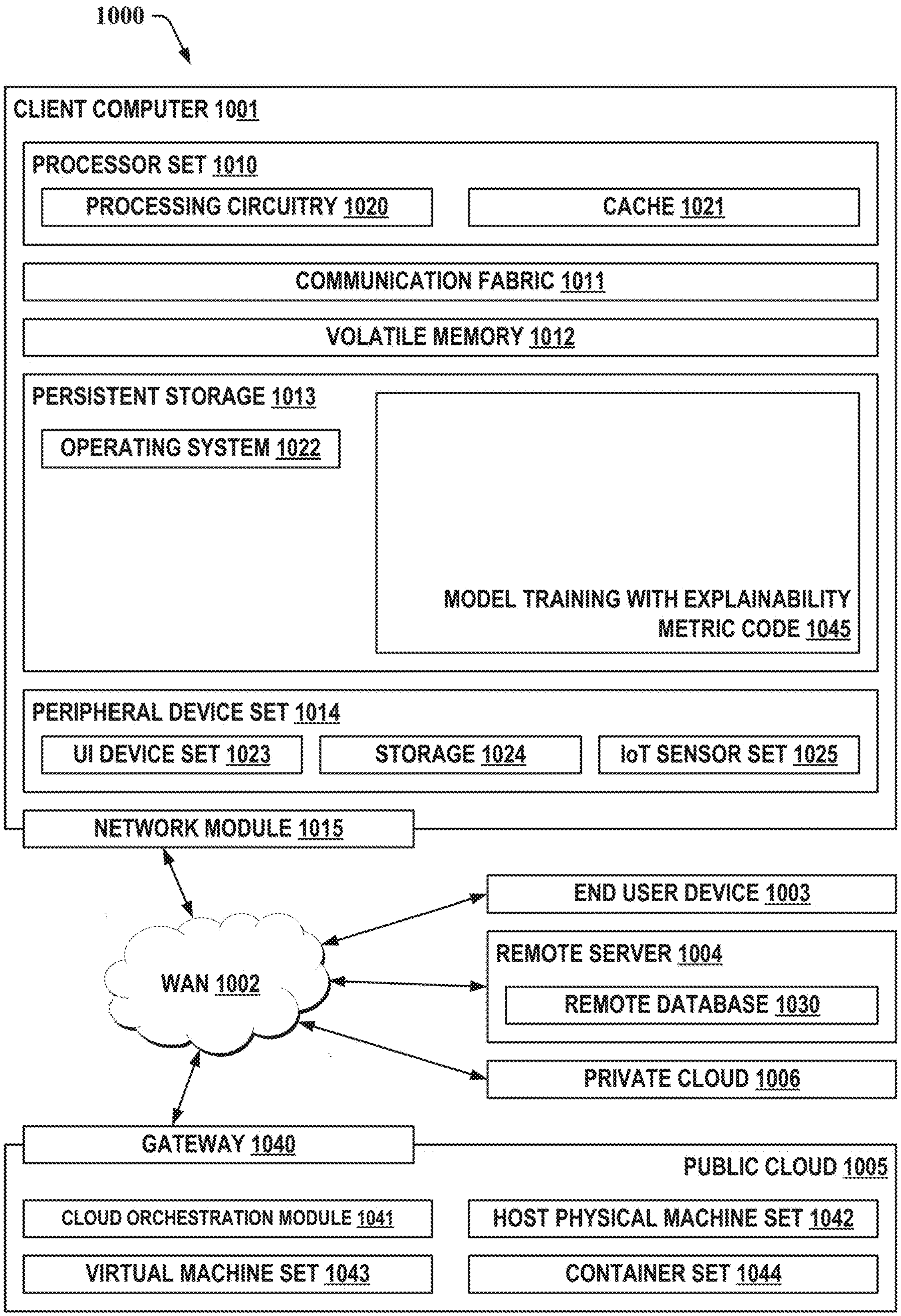
FIG. 10 illustrates a block diagram of an example, non-limiting operating environment in which one or more embodiments described herein can be facilitated.

FIG. 10 illustrates a block diagram of an example, non-limiting, operating environment in which one or more embodiments described herein can be facilitated. FIG. 10 and the following discussion are intended to provide a general description of a suitable operating environment 1000 in which one or more embodiments described herein at FIGS. 1-9 can be implemented.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1000 contains an example of an environment for the execution of at least some of the computer code involved in performing the inventive methods, such as model training with explainability metric code 1045. In addition to block 1045, computing environment 1000 includes, for example, computer 1001, wide area network (WAN) 1002, end user device (EUD) 1003, remote server 1004, public cloud 1005, and private cloud 1006. In this embodiment, computer 1001 includes processor set 1010 (including processing circuitry 1020 and cache 1021), communication fabric 1011, volatile memory 1012, persistent storage 1013 (including operating system 1022 and block 1045, as identified above), peripheral device set 1014 (including user interface (UI), device set 1023, storage 1024, and Internet of Things (IoT) sensor set 1025), and network module 1015. Remote server 1004 includes remote database 1030. Public cloud 1005 includes gateway 1040, cloud orchestration module 1041, host physical machine set 1042, virtual machine set 1043, and container set 1044.

COMPUTER 1001 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1030. As is well understood in the art of computer technology, and depending upon the technology, performance of a computer-implemented method may be distributed among multiple computers and/or between multiple locations. On the other hand, in this presentation of computing environment 1000, detailed discussion is focused on a single computer, specifically computer 1001, to keep the presentation as simple as possible. Computer 1001 may be located in a cloud, even though it is not shown in a cloud in FIG. 10. On the other hand, computer 1001 is not required to be in a cloud except to any extent as may be affirmatively indicated.

PROCESSOR SET 1010 includes one, or more, computer processors of any type now known or to be developed in the future. Processing circuitry 1020 may be distributed over multiple packages, for example, multiple, coordinated integrated circuit chips. Processing circuitry 1020 may implement multiple processor threads and/or multiple processor cores. Cache 1021 is memory that is located in the processor chip package(s) and is typically used for data or code that should be available for rapid access by the threads or cores running on processor set 1010. Cache memories are typically organized into multiple levels depending upon relative proximity to the processing circuitry. Alternatively, some, or all, of the cache for the processor set may be located "off chip." In some computing environments, processor set 1010 may be designed for working with qubits and performing quantum computing.

Computer readable program instructions are typically loaded onto computer 1001 to cause a series of operational steps to be performed by processor set 1010 of computer 1001 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1021 and the other storage media discussed below. The program instructions, and associated data, are accessed by processor set 1010 to control and direct performance of the inventive methods. In computing environment 1000, at least some of the instructions for performing the inventive methods may be stored in block 1045 in persistent storage 1013.

COMMUNICATION FABRIC 1011 is the signal conduction paths that allow the various components of computer 1001 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1012 is any type of volatile memory now known or to be developed in the future. Examples include dynamic type random access memory (RAM) or static type RAM. Typically, the volatile memory is characterized by random access, but this is not required unless affirmatively indicated. In computer 1001, the volatile memory 1012 is located in a single package and is internal to computer 1001, but, alternatively or additionally, the volatile memory may be distributed over multiple packages and/or located externally with respect to computer 1001.

PERSISTENT STORAGE 1013 is any form of non-volatile storage for computers that is now known or to be developed in the future. The non-volatility of this storage means that the stored data is maintained regardless of whether power is being supplied to computer 1001 and/or directly to persistent storage 1013. Persistent storage 1013 may be a read only memory (ROM), but typically at least a portion of the persistent storage allows writing of data, deletion of data and re-writing of data. Some familiar forms of persistent storage include magnetic disks and solid state storage devices. Operating system 1022 may take several forms, such as various known proprietary operating systems or open source Portable Operating System Interface type operating systems that employ a kernel. The code included in block 1045 typically includes at least some of the computer code involved in performing the inventive methods.

PERIPHERAL DEVICE SET 1014 includes the set of peripheral devices of computer 1001. Data communication connections between the peripheral devices and the other components of computer 1001 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1023 may include components such as a display screen, speaker, microphone, wearable devices (such as goggles and smart watches), keyboard, mouse, printer, touchpad, game controllers, and haptic devices. Storage 1024 is external storage, such as an external hard drive, or insertable storage, such as an SD card. Storage 1024 may be persistent and/or volatile. In some embodiments, storage 1024 may take the form of a quantum computing storage device for storing data in the form of qubits. In embodiments where computer 1001 is required to have a large amount of storage (for example, where computer 1001 locally stores and manages a large database) then this storage may be provided by peripheral storage devices designed for storing very large amounts of data, such as a storage area network (SAN) that is shared by multiple, geographically distributed computers. IoT sensor set 1025 is made up of sensors that can be used in Internet of Things applications. For example, one sensor may be a thermometer and another sensor may be a motion detector.

NETWORK MODULE 1015 is the collection of computer software, hardware, and firmware that allows computer 1001 to communicate with other computers through WAN 1002. Network module 1015 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1015 are performed on the same physical hardware device. In other embodiments (for example, embodiments that utilize software-defined networking (SDN)), the control functions and the forwarding functions of network module 1015 are performed on physically separate devices, such that the control functions manage several different network hardware devices. Computer readable program instructions for performing the inventive methods can typically be downloaded to computer 1001 from an external computer or external storage device through a network adapter card or network interface included in network module 1015.

WAN 1002 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1003 is any computer system that is used and controlled by an end user (for example, a customer of an enterprise that operates computer 1001), and may take any of the forms discussed above in connection with computer 1001. EUD 1003 typically receives helpful and useful data from the operations of computer 1001. For example, in a hypothetical case where computer 1001 is designed to provide a recommendation to an end user, this recommendation would typically be communicated from network module 1015 of computer 1001 through WAN 1002 to EUD 1003. In this way, EUD 1003 can display, or otherwise present, the recommendation to an end user. In some embodiments, EUD 1003 may be a client device, such as thin client, heavy client, mainframe computer, desktop computer and so on.

REMOTE SERVER 1004 is any computer system that serves at least some data and/or functionality to computer 1001. Remote server 1004 may be controlled and used by the same entity that operates computer 1001. Remote server 1004 represents the machine(s) that collect and store helpful and useful data for use by other computers, such as computer 1001. For example, in a hypothetical case where computer 1001 is designed and programmed to provide a recommendation based on historical data, then this historical data may be provided to computer 1001 from remote database 1030 of remote server 1004.

PUBLIC CLOUD 1005 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1005 is performed by the computer hardware and/or software of cloud orchestration module 1041. The computing resources provided by public cloud 1005 are typically implemented by virtual computing environments that run on various computers making up the computers of host physical machine set 1042, which is the universe of physical computers in and/or available to public cloud 1005. The virtual computing environments (VCEs) typically take the form of virtual machines from virtual machine set 1043 and/or containers from container set 1044. It is understood that these VCEs may be stored as images and may be transferred among and between the various physical machine hosts, either as images or after instantiation of the VCE. Cloud orchestration module 1041 manages the transfer and storage of images, deploys new instantiations of VCEs and manages active instantiations of VCE deployments. Gateway 1040 is the collection of computer software, hardware, and firmware that allows public cloud 1005 to communicate through WAN 1002.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1006 is similar to public cloud 1005, except that the computing resources are only available for use by a single enterprise. While private cloud 1006 is depicted as being in communication with WAN 1002, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1005 and private cloud 1006 are both part of a larger hybrid cloud.

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented at least partially in parallel with one or more other program modules. Generally, program modules include routines, programs, components and/or data structures that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), and/or microprocessor-based or programmable consumer and/or industrial electronics. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform" and/or "interface" can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random-access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed:

1. A system, comprising:

a memory that stores computer-executable components; and a processor that executes the computer-executable components stored in the memory, wherein the computer-executable components comprise:

a training component that trains a machine learning model using an objective function that incorporates an explainability metric for the machine learning model in addition to a model performance metric of the machine learning model; a computation component that computes first explainability values corresponding to training data of the machine learning model and second explainability values corresponding to validation data of the machine learning model, and normalizes the first explainability values and the second explainability values; and an update component that computes a feature preference vector based on a comparison between the normalized first explainability values and the normalized second explainability values, wherein the comparison determines comparability between respective explainabilities of the machine learning model on the training data and the validation data, wherein the feature preference vector is incorporated into an explainability term of the objective function, wherein the training component retrains the machine learning model using the objective function modified based on the feature preference vector by executing a genetic algorithm that uses the objective function to evaluate a fitness of candidate solutions, wherein the objective function is recomputed during respective iterations based on a feature preference vector computed for a previous iteration, and wherein the update component iteratively updates the feature preference vector during training of the machine learning model until the objective function stabilizes or a maximum number of iterations is reached.

2. The system of claim 1, further comprising:

a definition component that defines feature preferences for the machine learning model, wherein defining the feature preferences comprises defining respective numerical feature preference values for one or more features of training data of the machine learning model.

3. The system of claim 2, wherein the defining the respective numerical feature preference values modifies the objective function to increase reliance on at least a first feature of the training data to a greater extent than a second feature of the training data.

4. The system of claim 2, wherein the feature preferences are defined globally for the machine learning model or locally for one or more records of the training data.

5. The system of claim 1, wherein the computation component quantifies explainability of the machine learning model based on the objective function, the training data of the machine learning model and the validation data of the machine learning model by comparing the normalized first explainability values and the normalized second explainability values.

6. The system of claim 5, wherein the update component iteratively updates a feature preference vector corresponding to the explainability of the machine learning model based on the computation component quantifying the explainability of the machine learning model until the objective function stabilizes or a maximum number of iterations is reached.

7. The system of claim 1, wherein training the machine learning model based on the model performance metric and the explainability metric weights a performance of the machine learning model relative to explainability of the machine learning model using a scalar weighting parameter.

8. A computer-implemented method, comprising:

training, by a system operatively coupled to a processor, a machine learning model using an objective function that incorporates an explainability metric for the machine learning model in addition to a model performance metric of the machine learning model; computing, by the system, first explainability values corresponding to training data of the machine learning model and second explainability values corresponding to validation data of the machine learning model;

normalizing, by the system, the first explainability values and the second explainability values; comparing, by the system, the normalized first explainability values and the normalized second explainability values to determine comparability between respective explainabilities of the machine learning model on the training data and the validation data;

computing, by the system, a feature preference vector based on the comparison between the normalized first explainability values and the normalized second explainability values;

incorporating, by the system, the feature preference vector into an explainability term of the objective function; and iteratively retraining, by the system, the machine learning model using the objective function modified based on the feature preference vector by executing a genetic algorithm that uses the objective function to evaluate a fitness of candidate solutions, wherein the objective function is recomputed during respective iterations based on a feature preference vector computed for a previous iteration, until the objective function stabilizes or a maximum number of iterations is reached.

9. The computer-implemented method of claim 8, further comprising:

defining, by the system, feature preferences for the machine learning model, wherein defining the feature preferences comprises defining respective numerical feature preference values for one or more features of training data of the machine learning model.

10. The computer-implemented method of claim 9, wherein defining the respective numerical feature preference values modifies the objective function to increase reliance on at least a first feature of the training data to a greater extent than a second feature of the training data.

11. The computer-implemented method of claim 9, wherein the feature preferences are defined globally for the machine learning model or locally for one or more records of the training data.

12. The computer-implemented method of claim 8, further comprising:

quantifying, by the system, explainability of the machine learning model based on the objective function, training data of the machine learning model and validation data of the machine learning model by comparing the normalized first explainability values and the normalized second explainability values.

13. The computer-implemented method of claim 12, further comprising:

updating, by the system, a feature preference vector corresponding to the explainability of the machine learning model based on the quantifying of the explainability of the machine learning model, wherein the updating is iterative until the objective function stabilizes or a maximum number of iterations is reached.

14. The computer-implemented method of claim 8, wherein training the machine learning model based on the model performance metric and the explainability metric weights a performance of the machine learning model and explainability of the machine learning model in favor of the performance or the explainability using a scalar weighting parameter.

15. A computer program product for incorporating an explainability constraint into a decision tree ensemble model, the computer program product comprising a computer readable storage medium having program instructions embodied therewith, the program instructions executable by a processor to cause the processor to:

train, by the processor, the decision tree ensemble model using an objective function that incorporates an explainability metric for the decision tree ensemble model in addition to a model performance metric of the decision tree ensemble model;

compute first explainability values corresponding to training data of the decision tree ensemble model and second explainability values corresponding to validation data of the decision tree ensemble model;

normalize the first explainability values and the second explainability values;

compare the normalized first explainability values and the normalized second explainability values to determine comparability between respective explainabilities of the decision tree ensemble model on the training data and the validation data;

compute a feature preference vector based on the comparison between the normalized first explainability values and the normalized second explainability values;

incorporate the feature preference vector into an explainability term of the objective function; and iteratively retrain the decision tree ensemble model using the objective function modified based on the feature preference vector by executing a genetic algorithm that uses the objective function to evaluate a fitness of candidate solutions, wherein the objective function is recomputed during respective iterations based on a feature preference vector computed for a previous iteration, until the objective function stabilizes or a maximum number of iterations is reached.

16. The computer program product of claim 15, wherein the program instructions are further executable by the processor to cause the processor to:

define, by the processor, feature preferences for the decision tree ensemble model, wherein defining the feature preferences comprises defining respective numerical feature preference values for one or more features of training data of the decision tree ensemble model.

17. The computer program product of claim 16, wherein the defining the respective numerical feature preference values modifies the objective function to increase reliance on at least a first feature of the training data relative to a second feature of the training data.

18. The computer program product of claim 16, wherein the feature preferences are defined globally for the decision tree ensemble model or locally for one or more records of the training data.

19. The computer program product of claim 15, wherein the program instructions are further executable by the processor to cause the processor to:

quantify, by the processor, explainability of the decision tree ensemble model based on the objective function, training data of the decision tree ensemble model and validation data of the decision tree ensemble model by comparing the normalized first explainability values and the normalized second explainability values; and update, by the processor, a feature preference vector corresponding to the explainability of the decision tree ensemble model based on the quantifying of the explainability of the decision tree ensemble model, wherein the updating is iterative until the objective function stabilizes or a maximum number of iterations is reached.

20. The computer program product of claim 15, wherein training the decision tree ensemble model based on the model performance metric and the explainability metric weights a performance of the decision tree ensemble model relative to explainability of the decision tree ensemble model using a scalar weighting parameter.

* * * * *